(12) United States Patent
Sugiura

(10) Patent No.: US 8,099,569 B2
(45) Date of Patent: Jan. 17, 2012

(54) STORAGE SYSTEM AND DATA MIGRATION METHOD

(75) Inventor: Yoko Sugiura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 12/149,072

(22) Filed: Apr. 25, 2008

(65) Prior Publication Data

US 2009/0222631 A1   Sep. 3, 2009

(30) Foreign Application Priority Data

Feb. 29, 2008   (JP) ................... 2008-050554

(51) Int. Cl.
*G06F 12/00* (2006.01)
(52) U.S. Cl. .................. 711/161; 711/162
(58) Field of Classification Search .......... 711/161, 711/162
See application file for complete search history.

(56) References Cited

U.S. PATENT DOCUMENTS

| | | | |
|---|---|---|---|
| 5,794,255 A * | 8/1998 | Hayashi et al. ......... | 1/1 |
| 2004/0133718 A1* | 7/2004 | Kodama et al. ......... | 710/74 |
| 2005/0010733 A1 | 1/2005 | Mimatsu et al. | |
| 2005/0055402 A1 | 3/2005 | Sato | |
| 2005/0055512 A1* | 3/2005 | Kishi ................. | 711/135 |
| 2005/0086443 A1* | 4/2005 | Mizuno et al. .......... | 711/162 |
| 2006/0047923 A1 | 3/2006 | Kodama | |
| 2006/0218367 A1* | 9/2006 | Ukai et al. ............ | 711/165 |
| 2006/0288048 A1 | 12/2006 | Kamohara et al. | |
| 2007/0162721 A1 | 7/2007 | Honda et al. | |

FOREIGN PATENT DOCUMENTS

| | | |
|---|---|---|
| JP | 2006-072981 | 7/2005 |
| JP | 2007-048323 | 11/2006 |

OTHER PUBLICATIONS

Hutchinson et al., Feb. 1999, "Logical Vs. Physical File System Backup", OSDI 1999, pp. 239-249.*
Hutchinson, N.C., et al., "Logical Vs. Physical File System Backup," Usenix Association Proceedings Of The 3rd Symposium On Operating Systems Design And Implementation. (OSDI 1999) Operating Systems Review: OSR Special Issue-Winter 1998, New Orleans, Feb. 22-25, 1999, pp. 239-249, XP002194026.
Cuneo, Francois, "CarbonCopy Cloner 3 Contre SuperDuper Pour Un Bon Clone," Oct. 5, 2007, pp. 1-13, XP007915447, <http://www.cuk.ch/articles/imprimer13599>, Retrieved from the Internet Aug. 30, 2011 (English Translation, 10 pages).

* cited by examiner

*Primary Examiner* — Hashem Farrokh
(74) *Attorney, Agent, or Firm* — Volpe and Koenig, P.C.

(57) ABSTRACT

Proposed are a storage system and a data migration method capable of effectively performing data migration between storage apparatuses. This storage system includes a host apparatus equipped with a function for copying data stored in a first volume of a first storage apparatus in file units to a corresponding second volume of a second storage apparatus, and a controller equipped with a function for controlling the first and second storage apparatuses to copy data stored in the first volume to the second volume in volume units. Necessary control processing is executed to decide whether to migrate data stored in the first volume in volume units or file units according to the status of data stored in the first volume to be subject to data migration.

17 Claims, 32 Drawing Sheets

FIG.14

| VOLUME MIGRATION FLAG | FILE MIGRATION FLAG |
|---|---|
| OFF | OFF |

| STORAGE IDENTIFICATION # | 001 | 002 | 003 |
|---|---|---|---|
| WWN | 11.11.11.11.11.11.11.11 | 22.22.22.22.22.22.22.22 | 33.33.33.33.33.33.33.33 |
| MIGRATION SOURCE/ MIGRATION DESTINATION | SOURCE | DESTINATION | EXTERNAL |

| | | | | |
|---|---|---|---|---|
| STORAGE IDENTIFICATION # | 001 | 001 | 001 | 92A |
| LUN | 1 | 2 | 2 | 92B |
| LDEV# | 001_01 | 001_02 | 001_02 | 92C |
| CAPACITY | 100G | 20G | 20G | 92D |
| FStype | - | NFS | NFS | 92E |
| FSname | - | /opt | /usr | 92F |
| FScapacity | - | 10G | 10G | 92G |
| FSmode | - | mount | mount | 92H |
| Last access | xxx | xxx | xxx | 92I |
| Last modified | - | xxx | xxx | 92J |
| MIGRATION TARGET | 1 | 2 | 2 | 92K |
| CPmode | Volume② | File② | File① | 92L |
| CPstatus | Done | - | - | 92M |
| EXTERNAL STORAGE IDENTIFICATION # | 003 | - | - | 92N |
| EXTERNAL LDEV # | 003_011 | - | - | 92P |

| | | | | |
|---|---|---|---|---|
| STORAGE IDENTIFICATION # | 002 | 002 | 002 | 92A |
| LUN | 3 | 4 | 4 | 92B |
| LDEV# | 002_01 | 002_02 | 002_02 | 92C |
| CAPACITY | 100G | 20G | 20G | 92D |
| FStype | - | NFS | NFS | 92E |
| FSname | - | /opt | /usr | 92F |
| FScapacity | - | 10G | 10G | 92G |
| FSmode | - | mount | mount | 92H |
| Last access | - | - | - | 92I |
| Last modified | - | - | - | 92J |
| MIGRATION TARGET | 1 | 2 | 2 | 92K |
| CPmode | Volume② | File② | File① | 92L |
| CPstatus | Done | - | - | 92M |
| EXTERNAL STORAGE IDENTIFICATION # | 003 | - | - | 92N |
| EXTERNAL LDEV # | 003_012 | - | - | 92P |

| INTERNAL (VIRTUAL) LDEV | | | EXTERNAL LDEV | | |
|---|---|---|---|---|---|
| LDEV# | CAPACITY (GB) | LUN | STORAGE IDENTIFICATION # | LDEV# | LUN |
| 003_011 | 100 | 9 | 001 | 001_01 | 5 |
| 003_021 | 20 | 10 | 001 | 001_02 | 6 |
| 003_012 | 100 | 11 | 002 | 002_01 | 7 |
| 003_022 | 20 | 12 | 002 | 002_02 | 8 |
| ... | ... | ... | ... | ... | ... |

| | | LUN OF INTERNAL LDEV | |
| --- | --- | --- | --- |
| | | YES | NO |
| LUN OF EXTERNAL LDEV | YES | REAL DATA IS ACCESSIBLE FROM HOST IN EXTERNAL LDEV | STANDARD INTERNAL LDEV HOST; INACCESSIBLE FROM HOST |
| | NO | | UNUSED VOLUME; INACCESSIBLE FROM HOST |

| PAIR NUMBER | PRIMARY LDEV # | SECONDARY LDEV # | STATUS |
|---|---|---|---|
| 1 | 10 | 11 | Pair |
| 2 | 12 | 20 | Split |
| ... | ... | ... | ... |
| n | ... | ... | ... |
| 94A | 94B | 94C | 94D |

| STORAGE IDENTIFICATION # | 001 | 002 | } 91A |
|---|---|---|---|
| WWN | 11.11.11.11.11.11.11.11 | 22.22.22.22.22.22.22.22 | } 91B |
| MIGRATION SOURCE/ MIGRATION DESTINATION | - | - | } 91C |

| STORAGE IDENTIFICATION # | 001 | 001 | 001 | |
|---|---|---|---|---|
| LUN | 1 | 2 | 2 | 92A |
| LDEV# | 001_01 | 001_02 | 001_02 | 92B |
| CAPACITY | 100G | 20G | 20G | 92C |
| FStype | - | NFS | NFS | 92D |
| FSname | - | /opt | /usr | 92E |
| FScapacity | - | 10G | 10G | 92F |
| FSmode | unmount | mount | mount | 92G |
| Last access | xxx | xxx | xxx | 92H |
| Last modified | - | xxx | xxx | 92I |
| MIGRATION TARGET | - | - | - | 92J |
| CPmode | - | - | - | 92K |
| CPstatus | - | - | - | 92L |
| EXTERNAL STORAGE IDENTIFICATION # | - | - | - | 92M |
| LDEV # | - | - | - | 92N |

| STORAGE IDENTIFICATION # | 002 | 002 | |
|---|---|---|---|
| LUN | 1 | 2 | 92A |
| LDEV# | 002_01 | 002_02 | 92B |
| CAPACITY | 100G | 20G | 92C |
| FStype | - | - | 92D |
| FSname | - | - | 92E |
| FScapacity | - | - | 92F |
| FSmode | - | - | 92G |
| Last access | - | - | 92H |
| Last modified | - | - | 92I |
| MIGRATION TARGET | - | - | 92J |
| CPmode | - | - | 92K |
| CPstatus | - | - | 92L |
| EXTERNAL STORAGE IDENTIFICATION # | - | - | 92M |
| LDEV # | - | - | 92N |

92(92-2)

| STORAGE IDENTIFICATION # | 001 | 002 | 003 | } 91A |
| --- | --- | --- | --- | --- |
| WWN | 11.11.11.11.11.11.11.11 | 22.22.22.22.22.22.22.22 | 33.33.33.33.33.33.33.33 | } 91B |
| MIGRATION SOURCE/ MIGRATION DESTINATION | SOURCE | DESTINATION | EXTERNAL | } 91C |

| STORAGE IDENTIFICATION # | 001 | 001 | 001 | | 92A |
|---|---|---|---|---|---|
| LUN | 1 | 2 | 2 | | 92B |
| LDEV# | 001_01 | 001_02 | 001_02 | | 92C |
| CAPACITY | 100G | 20G | 20G | | 92D |
| FStype | - | NFS | NFS | | 92E |
| FSname | - | /opt | /usr | | 92F |
| FScapacity | - | 10G | 10G | | 92G |
| FSmode | unmount | mount | mount | | 92H |
| Last access | xxx | xxx | xxx | | 92I |
| Last modified | - | xxx | xxx | | 92J |
| MIGRATION TARGET | 1 | 2 | 2 | | 92K |
| CPmode | - | - | - | | 92L |
| CPstatus | - | - | - | | 92M |
| EXTERNAL STORAGE IDENTIFICATION # | - | - | - | | 92N |
| LDEV # | - | - | - | | 92P |

| STORAGE IDENTIFICATION # | 002 | 002 | 92A |
|---|---|---|---|
| LUN | 1 | 2 | 92B |
| LDEV# | 002_01 | 002_02 | 92C |
| CAPACITY | 100G | 20G | 92D |
| FStype | - | - | 92E |
| FSname | - | - | 92F |
| FScapacity | - | - | 92G |
| FSmode | - | - | 92H |
| Last access | - | - | 92I |
| Last modified | - | - | 92J |
| MIGRATION TARGET | 1 | 2 | 92K |
| CPmode | - | - | 92L |
| CPstatus | - | - | 92M |
| EXTERNAL STORAGE IDENTIFICATION # | - | - | 92N |
| LDEV # | - | - | 92P |

92(92-2)

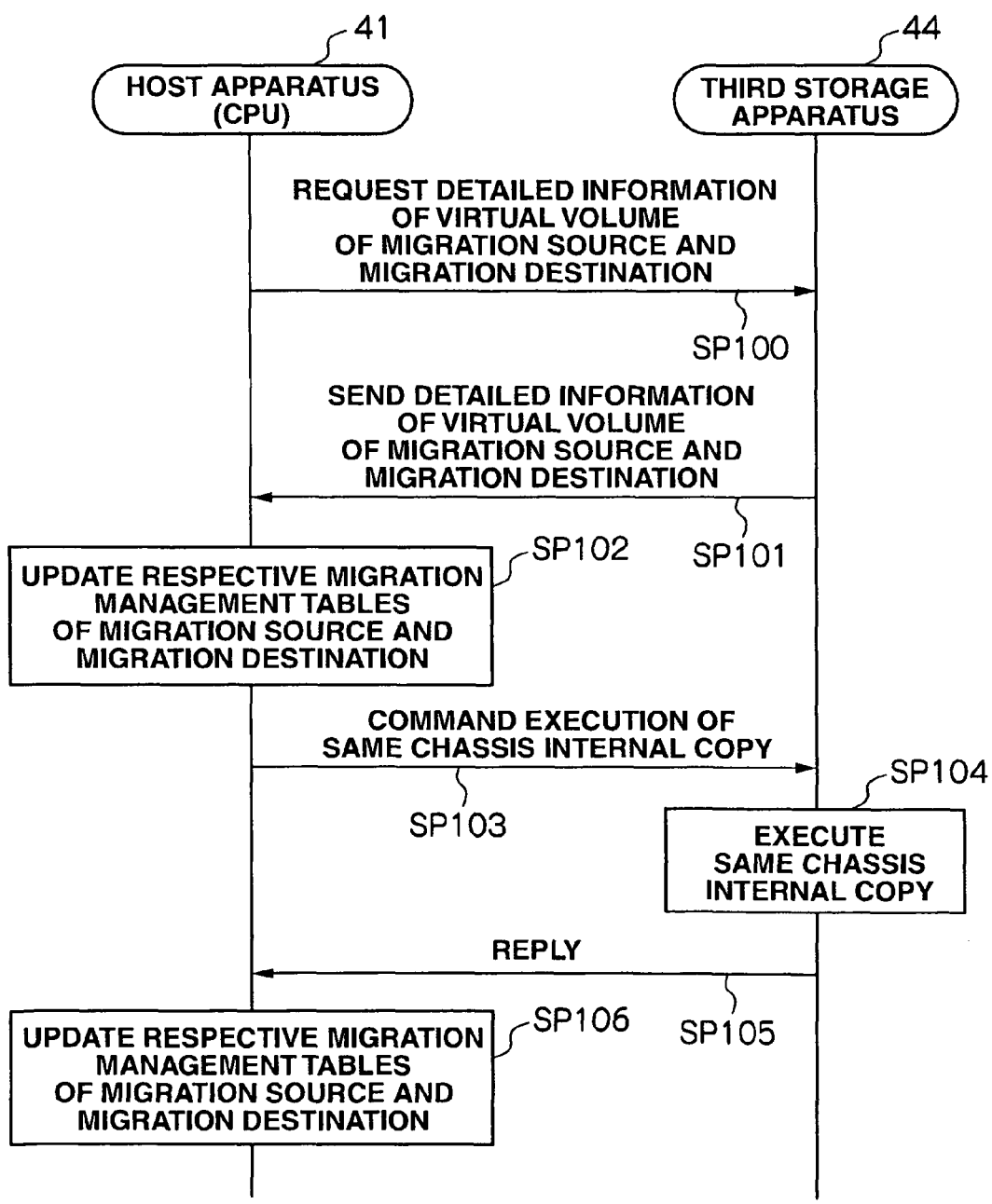

FIG.32A

| | | | | |
|---|---|---|---|---|
| STORAGE IDENTIFICATION # | 001 | 001 | 001 | 92A |
| LUN | 1 | 2 | 2 | 92B |
| LDEV# | 001_01 | 001_02 | 001_02 | 92C |
| CAPACITY | 100G | 20G | 20G | 92D |
| FStype | - | NFS | NFS | 92E |
| FSname | - | /opt | /usr | 92F |
| FScapacity | - | 10G | 10G | 92G |
| FSmode | - | mount | mount | 92H |
| Last access | xxx | xxx | xxx | 92I |
| Last modified | - | xxx | xxx | 92J |
| MIGRATION TARGET | 1 | 2 | 2 | 92K |
| CPmode | Volume② | File② | File① | 92L |
| CPstatus | Done | - | - | 92M |
| EXTERNAL STORAGE IDENTIFICATION # | 003 | - | - | 92N |
| EXTERNAL LDEV # | - | - | - | 92P |

| | | |
|---|---|---|
| STORAGE IDENTIFICATION # | 002 | 002 |
| LUN | 3 | 4 |
| LDEV# | 002_01 | 002_02 |
| CAPACITY | 100G | 20G |
| FStype | - | - |
| FSname | - | - |
| FScapacity | - | - |
| FSmode | - | - |
| Last access | - | - |
| Last modified | - | - |
| MIGRATION TARGET | 1 | 2 |
| CPmode | Volume② | - |
| CPstatus | Done | - |
| EXTERNAL STORAGE IDENTIFICATION # | 003 | - |
| EXTERNAL LDEV # | - | - |

92(92-2)

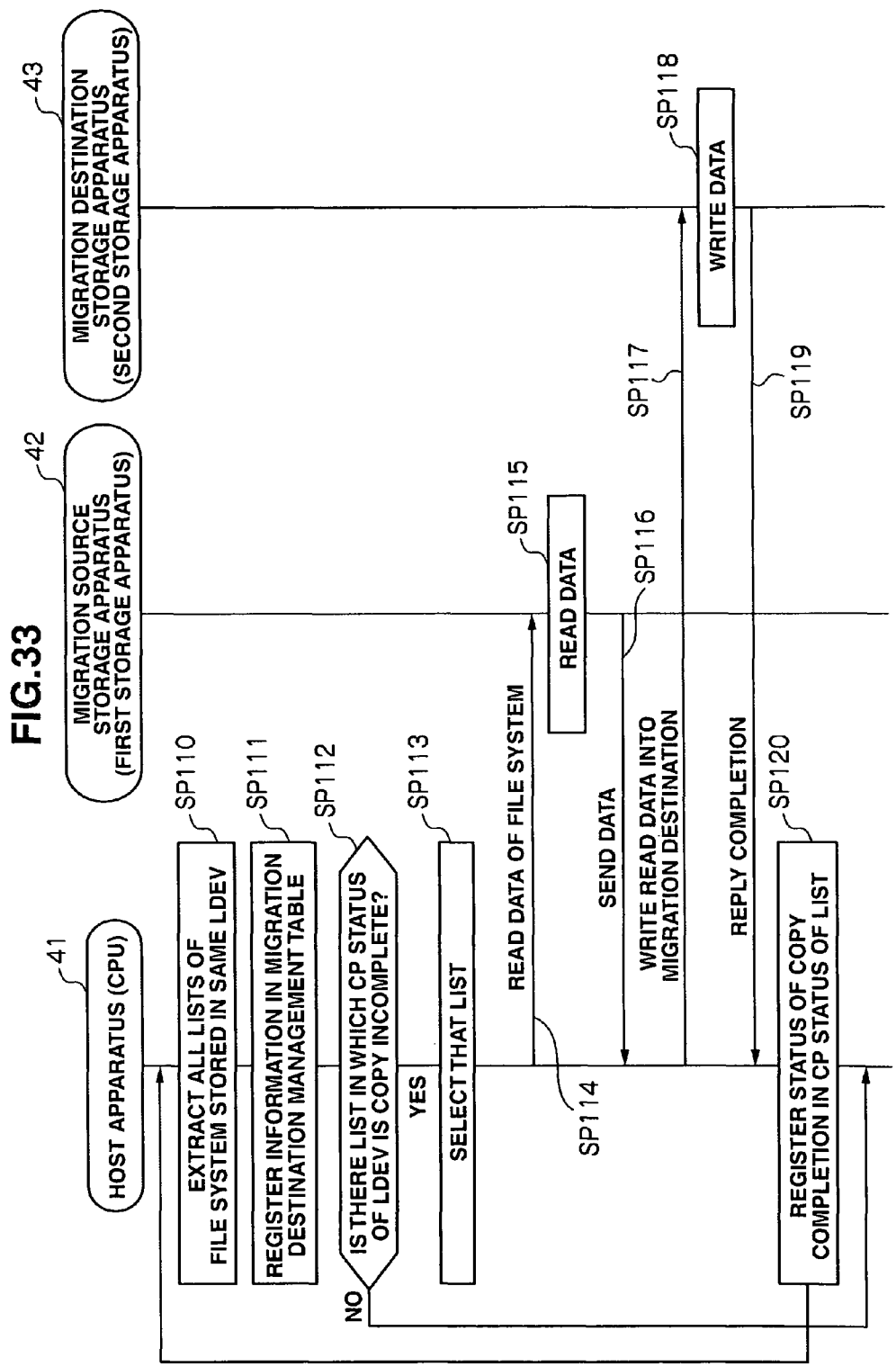

FIG.34A

| STORAGE IDENTIFICATION # | 001 | 001 | 001 | |
|---|---|---|---|---|
| LUN | 1 | 2 | 2 | 92A |
| LDEV# | 001_01 | 001_02 | 001_02 | 92B |
| CAPACITY | 100G | 20G | 20G | 92C |
| FStype | - | NFS | NFS | 92D |
| FSname | - | /opt | /usr | 92E |
| FScapacity | - | 10G | 10G | 92F |
| FSmode | - | mount | mount | 92G |
| Last access | xxx | xxx | xxx | 92H |
| Last modified | - | xxx | xxx | 92I |
| MIGRATION TARGET | 1 | 2 | 2 | 92J |
| CPmode | Volume② | File② | File① | 92K |
| CPstatus | Done | Done | Done | 92L |
| EXTERNAL STORAGE IDENTIFICATION # | 003 | - | - | 92M |
| EXTERNAL LDEV # | 003_011 | - | - | 92N |
| | | | | 92P |

| STORAGE IDENTIFICATION # | 002 | 002 | 002 | |
|---|---|---|---|---|
| LUN | 3 | 4 | 4 | 92A |
| LDEV# | 002_01 | 002_02 | 002_02 | 92B |
| CAPACITY | 100G | 20G | 20G | 92C |
| FStype | - | NFS | NFS | 92D |
| FSname | - | /opt | /usr | 92E |
| FScapacity | - | 10G | 10G | 92F |
| FSmode | - | mount | mount | 92G |
| Last access | - | - | - | 92H |
| Last modified | - | - | - | 92I |
| MIGRATION TARGET | 1 | 2 | 2 | 92J |
| CPmode | Volume② | File② | File① | 92K |
| CPstatus | Done | Done | Done | 92L |
| EXTERNAL STORAGE IDENTIFICATION # | 003 | - | - | 92M |
| EXTERNAL LDEV # | 003_012 | - | - | 92N |
| | | | | 92P |

| STORAGE IDENTIFICATION # | 001 | 002 | 003 | } 101A |
|---|---|---|---|---|
| WWN | 11.11.11.11.11.11.11.11 | 22.22.22.22.22.22.22.22 | 33.33.33.33.33.33.33.33 | } 101B |
| MIGRATION SOURCE/ MIGRATION DESTINATION | SOURCE | DESTINATION | EXTERNAL | } 101C |
| OVERALL STORAGE MIGRATION FLAG | 1 | - | - | } 101D |

| STORAGE IDENTIFICATION # | 001 | 001 | 001 | 92A |
|---|---|---|---|---|
| LUN | 1 | 2 | 2 | 92B |
| LDEV# | 001_01 | 001_02 | 001_02 | 92C |
| CAPACITY | 100G | 20G | 20G | 92D |
| FStype | - | NFS | NFS | 92E |
| FSname | - | /opt | /usr | 92F |
| FScapacity | - | 10G | 10G | 92G |
| FSmode | unmount | mount | mount | 92H |
| Last access | xxx | xxx | xxx | 92I |
| Last modified | - | xxx | xxx | 92J |
| MIGRATION TARGET | 1 | 2 | 2 | 92K |
| CPmode | - | - | - | 92L |
| CPstatus | - | - | - | 92M |
| EXTERNAL STORAGE IDENTIFICATION # | - | - | - | 92N |
| LDEV # | - | - | - | 92P |

| STORAGE IDENTIFICATION # | 002 | 002 | 92A |
|---|---|---|---|
| LUN | 3 | 4 | 92B |
| LDEV# | 002_01 | 002_02 | 92C |
| CAPACITY | 100G | 20G | 92D |
| FStype | - | - | 92E |
| FSname | - | - | 92F |
| FScapacity | - | - | 92G |
| FSmode | - | - | 92H |
| Last access | - | - | 92I |
| Last modified | - | - | 92J |
| MIGRATION TARGET | 1 | 2 | 92K |
| CPmode | - | - | 92L |
| CPstatus | - | - | 92M |
| EXTERNAL STORAGE IDENTIFICATION # | - | - | 92N |
| LDEV # | - | - | 92P |

92(92-2)

STORAGE SYSTEM AND DATA MIGRATION METHOD

CROSS-REFERENCES

This application relates to and claims priority from Japanese Patent Application No. 2008-050554, filed on Feb. 29, 2008, the entire disclosure of which is incorporated herein by reference.

BACKGROUND

The present invention generally related to a storage system and a data migration method and, for instance, can be suitably applied to an archive system that stores data for a long period of time.

Recently, in the field of storage systems, the concept of data lifecycle management (DLCM) is being proposed. This concept is an attempt to effectively store and manage data as a result of taking note of the fact that the value of data changes with the lapse of time.

For example, since the act of storing data with a reduced value in an expensive storage apparatus referred to as a "$1^{st}$ tier" is a waste of storage resources, information with a reduced value is archived in an inexpensive storage apparatus referred to as a "$2^{nd}$ tier" which is inferior to the $1^{st}$ tier in terms of reliability, response and durability as a storage device.

Among the data to be archived, there are data that must be stored for a given period of time under laws or according to internal regulations and the like. Depending on the type of data, there are certain data that need to be stored for a period of several years to several ten years (even longer in some cases).

In the foregoing case, since a storage apparatus has a service life, if the legal storage period of the archived data extends for a long period of time, the process of migrating data from an old, existing storage apparatus (hereinafter referred to as the "existing storage apparatus") to a new storage apparatus (hereinafter referred to as the "new storage apparatus") will become necessary during the storage period of the data. Data migration between storage apparatuses is also conducted daily in storage systems other than archive systems.

In relation to data migration, Japanese Patent Laid-Open Publication No. 2007-48323 discloses a virtualization controller that controls the data migration processing between a plurality of storage apparatuses, and Japanese Patent Laid-Open Publication No. 2006-72981 discloses technology of protecting data migrated from a primary storage system to an external storage system concerning DLCM.

SUMMARY

Meanwhile, if data migration can be efficiently performed upon migrating data between storage apparatuses, it is considered that the working efficiency upon replacing the storage apparatus from an existing storage apparatus to a new storage apparatus can be improved, and the work load of replacement can be alleviated.

The present invention was devised in view of the foregoing points. Thus, an object of the present invention is to propose a storage system and a data migration method capable of effectively performing data migration between storage apparatuses.

In order to achieve the foregoing object, the present invention provides a storage system comprising a host apparatus equipped with a second copy function for reading data stored in a first volume of a first storage apparatus in file units from the first storage apparatus and copying the data to a corresponding second volume of a second storage apparatus, a controller equipped with a first copy function for controlling the first and second storage apparatuses to copy data stored in the first volume to the second volume in volume units, and a data migration control unit for deciding whether to migrate data stored in the first volume according to a first data migration method that migrates data in volume units or a second data migration method that migrates data in file units according to the status of data stored in the first volume to be subject to data migration, and executing necessary control processing so that data migration is performed according to the decided first or second data migration method.

Thereby, with this storage system, data migration processing can be performed with the optimal data migration method according to the status of data stored in the first volume to be subject to data migration among the first and second data migration methods as the data migration method.

The present invention additionally provides a data migration method in a storage system including a host apparatus equipped with a second copy function for reading data stored in a first volume of a first storage apparatus in file units from the first storage apparatus and copying the data to a corresponding second volume of a second storage apparatus, and a controller equipped with a first copy function for controlling the first and second storage apparatuses to copy data stored in the first volume to the second volume in volume units. This data migration method comprises a first step for deciding whether to migrate data stored in the first volume according to a first data migration method that migrates data in volume units or a second data migration method that migrates data in file units according to the status of data stored in the first volume to be subject to data migration, and a second step for performing data migration according to the decided first or second data migration method.

Thereby, according to this data migration method, data migration processing can be performed with the optimal data migration method according to the status of data stored in the first volume to be subject to data migration among the first and second data migration methods as the data migration method.

According to the present invention, since data migration processing can be performed with the optimal data migration method according to the status of data stored in the first volume to be subject to data migration among the first and second data migration methods as the data migration method, data migration between storage apparatuses can be performed effectively.

DESCRIPTION OF DRAWINGS

FIG. 14 is a conceptual diagram explaining a mode management table;

FIG. 15 is a conceptual diagram explaining a storage management table;

FIG. 16A and FIG. 16B are conceptual diagrams explaining a migration management table;

FIG. 17A is a conceptual diagram explaining an LDEV management table, and FIG. 17B is a chart explaining the LDEV management table;

FIG. 22 is a conceptual diagram explaining a storage management table during the migration management table creation processing;

FIG. 23A and FIG. 23B are conceptual diagrams explaining a migration management table during the migration management table creation processing;

FIG. 26A and FIG. 26B are conceptual diagram explaining a migration management table during the data migration condition setting processing;

FIG. 31 is a flow diagram explaining the specific processing contents of the volume unit migration processing;

FIG. 32A and FIG. 32B are conceptual diagrams explaining a migration management table during the volume unit migration processing;

FIG. 33 is a flow diagram explaining the specific processing contents of the file units migration processing;

FIG. 34A and FIG. 34B are conceptual diagrams explaining a migration management table during the file units migration processing;

FIG. 35 is a conceptual diagram explaining the storage management table according to the second embodiment;

FIG. 37A and FIG. 37B are conceptual diagrams explaining a migration management table during the data migration condition setting processing according to the second embodiment.

DETAILED DESCRIPTION

An embodiment of the present invention is now explained in detail with reference to the attached drawings.

(1) Application Function in Storage Apparatus (1-1) Same Chassis Internal Copy Function Conventionally, as one application function loaded in a storage apparatus, there is a copy function (hereinafter referred to as the "same-chassis internal copy function") for creating a mirror of a logical device (hereinafter referred to as an "LDEV (Logical Device)" or a "volume") in the same storage apparatus without going through a host apparatus as the higher-level apparatus.

Figure 1:
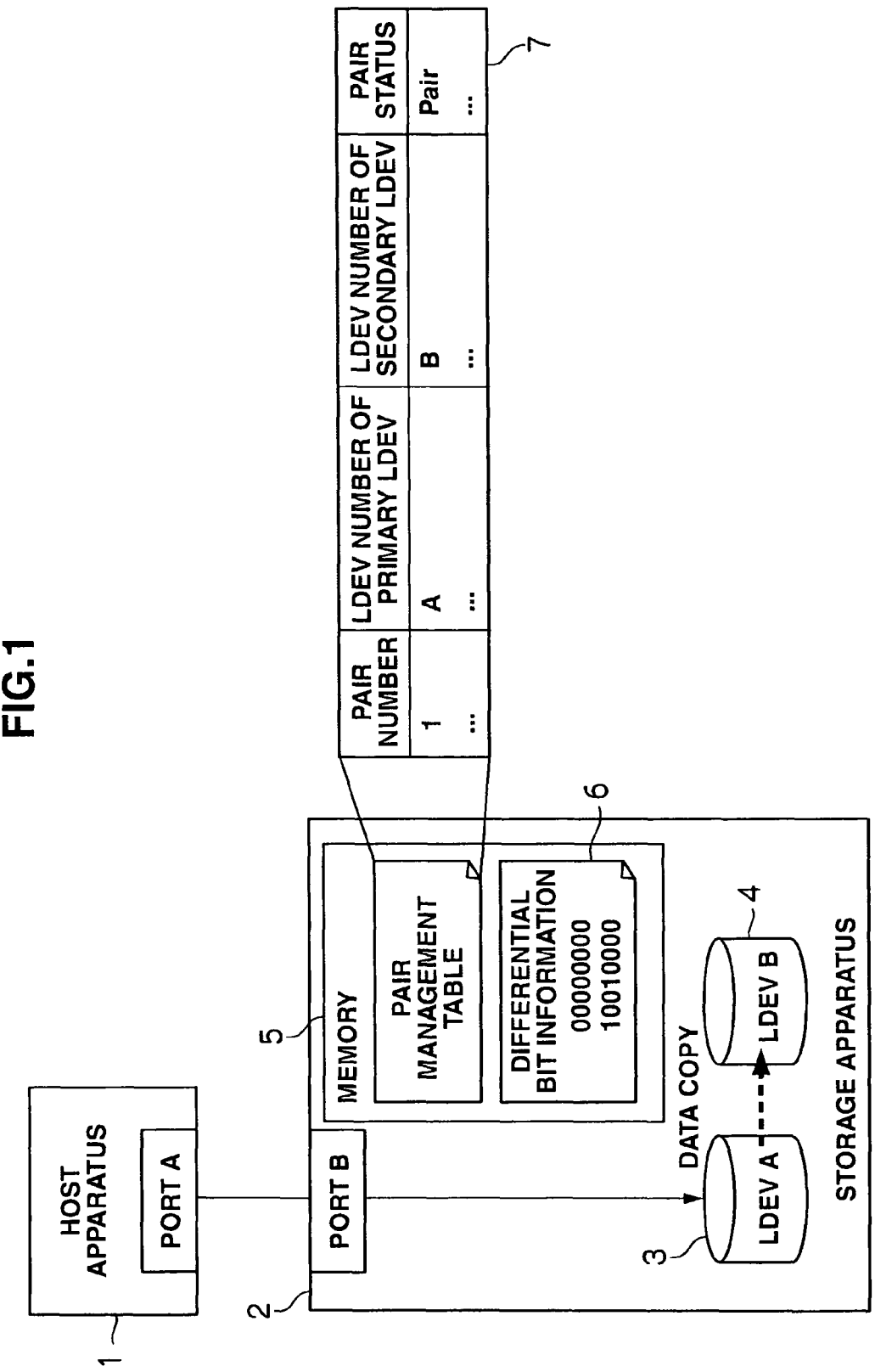
FIG. 1 is a conceptual diagram explaining the same-chassis internal copy function in a storage apparatus.

With the storage apparatus 2 equipped with the same-chassis internal copy function, upon executing the same-chassis internal copy function, as shown in FIG. 1, data stored in the LDEV (hereinafter referred to as the "primary LDEV") 3 as the copy source among the two LDEVs 3, 4 configured as a copy pair (hereinafter referred to as a "pair configuration") is copied beforehand to the LDEV (hereinafter referred to as the "secondary LDEV") 4 as the copy destination so as to make the content of the primary LDEV 3 and the content of the secondary LDEV 4 the same.

When the storage apparatus 2 receives a data write request from the host apparatus 1 for writing data into the primary LDEV 3, it writes data according to the write request into the designated address location of the primary LDEV 3, and writes the same data synchronously or asynchronously in the corresponding address location in the secondary LDEV 4.

When the mirror of the primary LDEV 3 and the secondary LDEV 4 is thereafter released and a data write request is issued from the host apparatus 1 for writing data into the primary LDEV 3 in a state where a snapshot is created, the storage apparatus 2 writes the write-target data into the primary LDEV 3 on the one hand, and additionally stores the address location in the primary LDEV 3 where the data was written on the other.

As means for achieving the above, the storage apparatus 2 retains a bit sequence of the same number of bits as the number of blocks, which is the data access unit in the primary LDEV 3, as differential bit information 6 in the internal memory 5, and manages the difference between the primary LDEV 3 and the secondary LDEV 4 by setting the value of the corresponding bit of the differential bit information 6 regarding a block in which the contents of the primary LDEV 3 and the secondary LDEV 4 are the same to "0," and setting the value of the corresponding bit regarding a block in which the contents of the primary LDEV 3 and the secondary LDEV 4 are different to "1."

Meanwhile, there are three types of copy pair statuses (hereinafter referred to as "pair statuses") in the same-chassis internal copy function; namely, "pair," "copy" and "split." With the storage apparatus 2 equipped with the same-chassis internal copy function, regarding each pair-configured primary LDEV 3 and secondary LDEV 4, the LDEV number of the primary LDEV 3 and the secondary LDEV 4 and the current pair status of the primary LDEV 3 and the secondary LDEV 4 are managed using the pair management table 7 stored in the internal memory 5.

Figure 2:
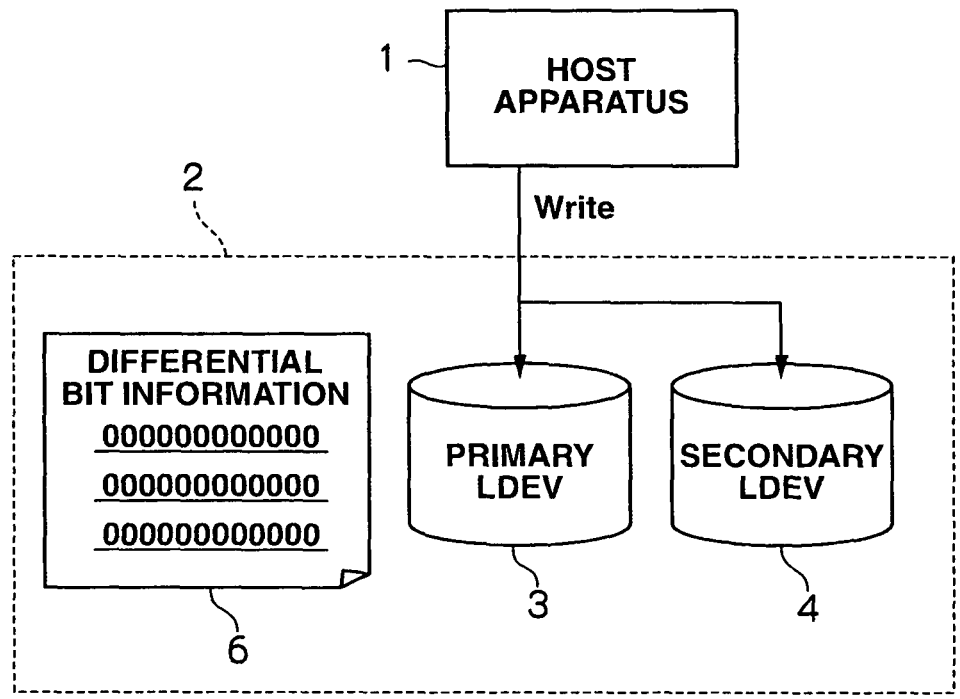
FIG. 2 is a conceptual diagram explaining the same-chassis internal copy function in a storage apparatus.

Here, the pair status of "pair," as shown in FIG. 2, is a status where the data copy from the primary LDEV 3 to the secondary LDEV 4 is complete and the primary LDEV 3 and the secondary LDEV 4 are mirrored. During this pair status, when data is written into the primary LDEV 3, the same data is simultaneously written into the corresponding block of the secondary LDEV 4. Further, during this pair status, since the contents of the primary LDEV 3 and the secondary LDEV 4 are equivalent, all bits of the differential bit information 6 will constantly be "0."

Figure 3:
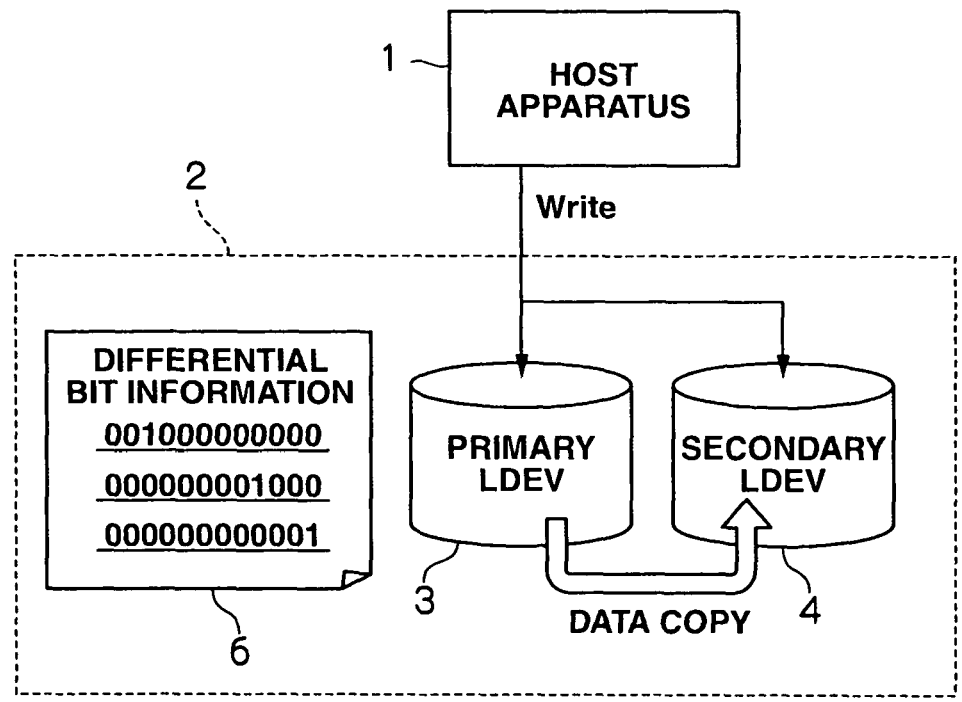
FIG. 3 is a conceptual diagram explaining the same-chassis internal copy function in a storage apparatus.

The pair status of "copy," as shown in FIG. 3, is a status where the data copy from the primary LDEV 3 to the secondary LDEV 4 is midway, and the primary LDEV 3 and the secondary LDEV 4 are not yet mirrored. During this pair status, when data is written into the primary LDEV 3, the same data is simultaneously written into the corresponding location of the secondary LDEV 4 on the one hand, and the data copy of blocks set as "1" of the differential bit information 6 is concurrently performed between the primary LDEV 3 and the secondary LDEV 4 on the other.

Figure 4:
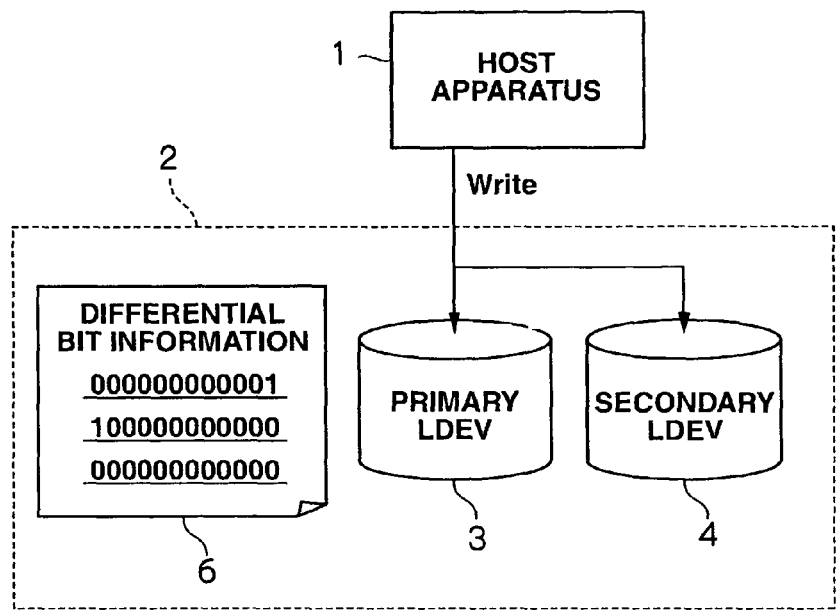
FIG. 4 is a conceptual diagram explaining the same-chassis internal copy function in a storage apparatus.

The pair status of "split," as shown in FIG. 4, is a status where data is not written into the secondary LDEV 4, and a snapshot of a certain point in time is created by the secondary LDEV 4. During this pair status, data is not written into the secondary LDEV 4 even if data is written into the primary LDEV 3, and "1" is set to the corresponding bits of the differential bit information 6.

Figure 5:
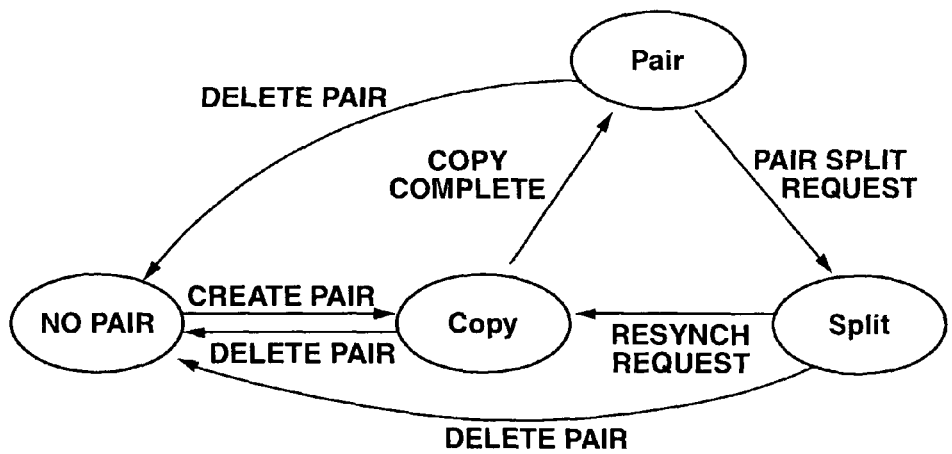
FIG. 5 is a transition diagram explaining the same-chassis internal copy function in a storage apparatus.

FIG. 5 shows the transition of the respective pair statuses of "pair," "copy" and "split," and the pair status ("no pair") with no pair configuration. As evident from FIG. 5, when two LDEVs are pair-configured from a pair status of "no pair," the pair status of that pair changes to "copy," and, when the subsequent data copy from the primary LDEV 3 to the secondary LDEV 4 is complete, the pair status changes to "pair."

When a pair split request is issued to the storage apparatus 2 from a pair status of "pair," the pair status of the primary LDEV 3 and the secondary LDEV 4 will become "split," and the pair status can be changed once again to "copy" by issuing a resynch request from the pair status of "split." In each case of "pair," "copy" and "split," the pair status can be changed to "no pair" by deleting the pair.

Figure 6:
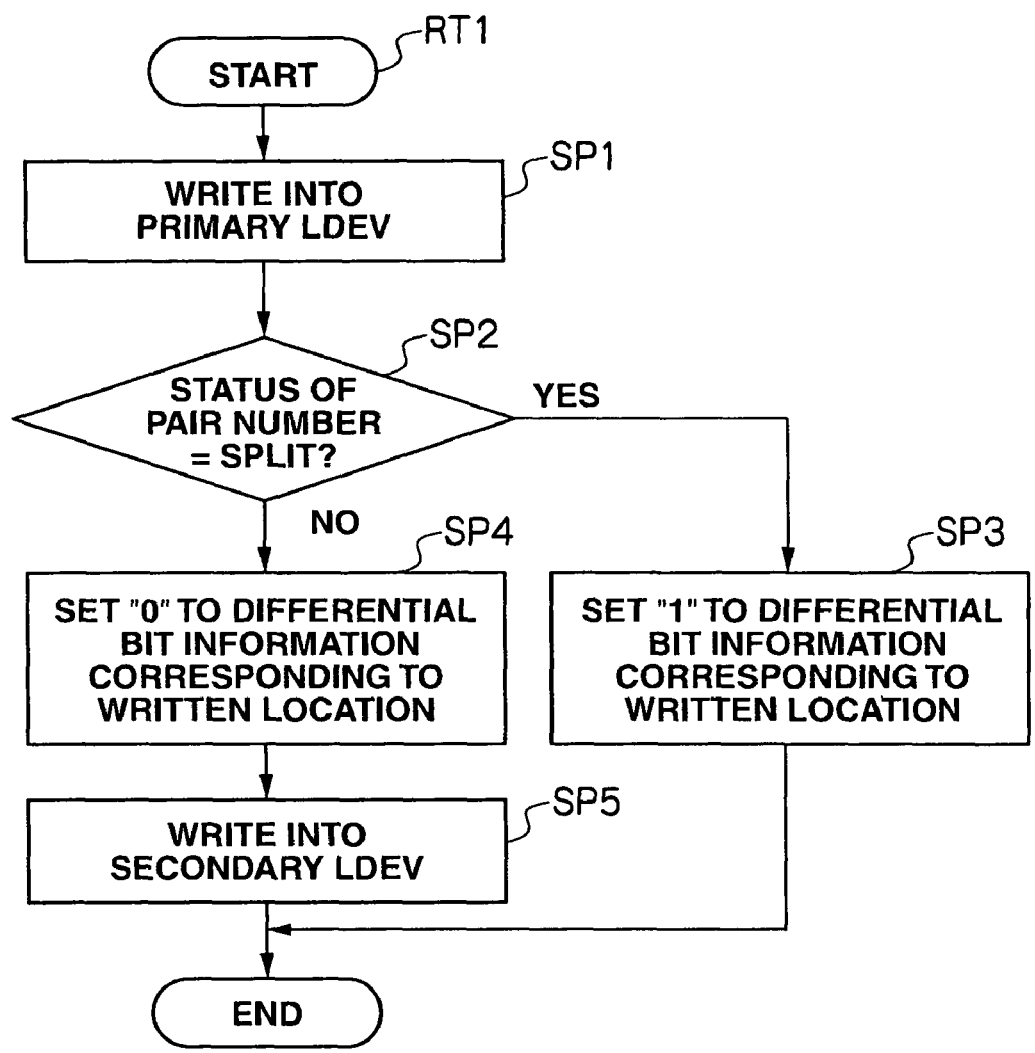
FIG. 6 is a flowchart explaining the same-chassis internal copy function in a storage apparatus.

FIG. 6 shows the processing contents of the storage apparatus 2 concerning the data write processing for writing data into the primary LDEV 3 upon executing the same-chassis internal copy function.

When a data write request is issued from the host apparatus 1 for writing data into the primary LDEV 3, the storage apparatus 2 foremost writes the write-target data provided from the host apparatus 1 together with the write request in a designated block of the primary LDEV 3 (SP1).

The storage apparatus 2 thereafter refers to the pair management table 7 (FIG. 1), and, if the pair status of the pair number given to the copy pair configured from the primary LDEV 3 and the corresponding secondary LDEV 4 is "split" (SP2: YES), sets the corresponding bits of the differential bit information 7 (FIG. 1) to "1" (SP3).

Contrarily, if the pair status of the pair configured from the primary LDEV 3 and the secondary LDEV 4 is not "split" (SP2: NO), the storage apparatus 2 sets the corresponding bits of the differential bit information 7 to "0" (SP4), and writes the same data as the data, which was written into the primary LDEV 3, into the corresponding block of the secondary LDEV 4 (SP5).

Figure 7:
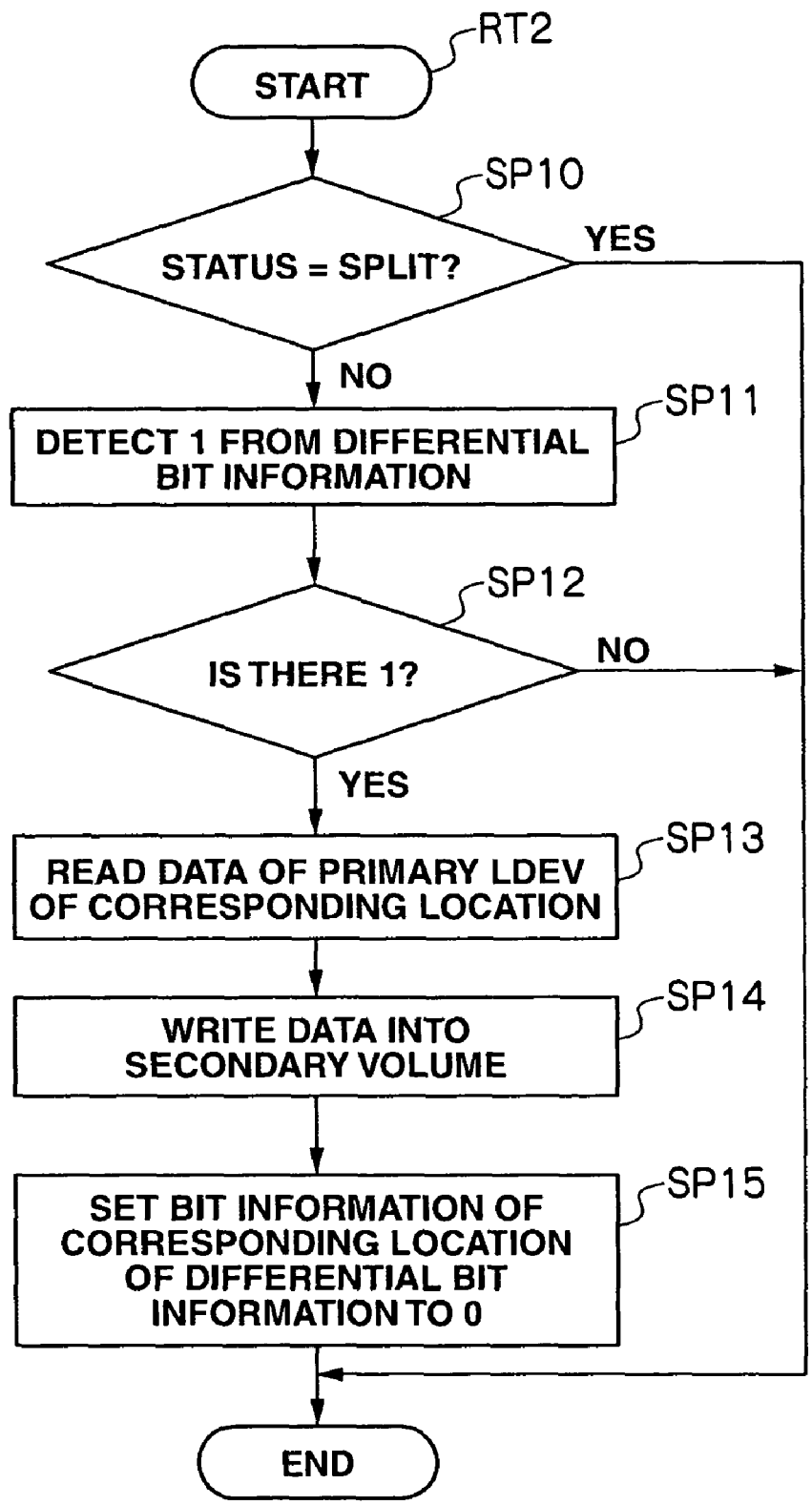
FIG. 7 is a flowchart explaining the same-chassis internal copy function in a storage apparatus.

Meanwhile, FIG. 7 is a flowchart showing the processing contents of the storage apparatus 2 concerning the data write processing (hereinafter referred to as the "data copy processing") of writing (copying) data into the secondary LDEV 4. The storage apparatus 2 executes, at regular time intervals, data copy processing of copying data to the secondary LDEV 4 asynchronously with the data write processing of writing data into the primary LDEV 3 according to this flowchart regarding the respective pairs of the primary LDEV 3 and the secondary LDEV 4 having a pair status of "pair" or "copy."

In other words, when the storage apparatus 2 starts the data copy processing, it foremost selects a pair of the primary LDEV 3 and the secondary LDEV 4 registered in the pair management table 5 (FIG. 1), and determines whether the pair status of that copy pair is "split" based on the pair management table 7 (SP10).

If the pair status of that pair is "split" (SP10: YES), the storage apparatus 2 ends this data copy processing, and, if the pair status of that pair is not "split" (SP10: NO), the storage apparatus 2 searches for bits with a value of "1" from the corresponding differential bit information (SP11).

If the storage apparatus 2 is not able to detect a bit of "1" (SP12: NO), it ends this data copy processing, and if the storage apparatus 2 is able to detect of a bit of "1" (SP12: YES), it reads data of a block corresponding to the block in the primary LDEV 3 (SP13), and writes this into the corresponding block in the secondary LDEV 4 (SP14).

Subsequently, the storage apparatus 2 changes the value of the bits determined to be "1" at step SP12 in the corresponding differential bit information to "0," and thereafter ends this data copy processing (SP16).

(1-2) External Connection Function (Virtualization Function)

Meanwhile, as another application function to be loaded in a storage apparatus, there is a function (hereinafter referred to as the "external connection function") of virtualizing the LDEV (hereinafter referred to as the "external LDEV") set in a storage apparatus (hereinafter referred to as the "external storage apparatus") other than the self storage apparatus and providing this to the host apparatus by making it appear as though it is the LDEV in the self storage apparatus (hereinafter referred to as the "internal LDEV").

Figure 8:
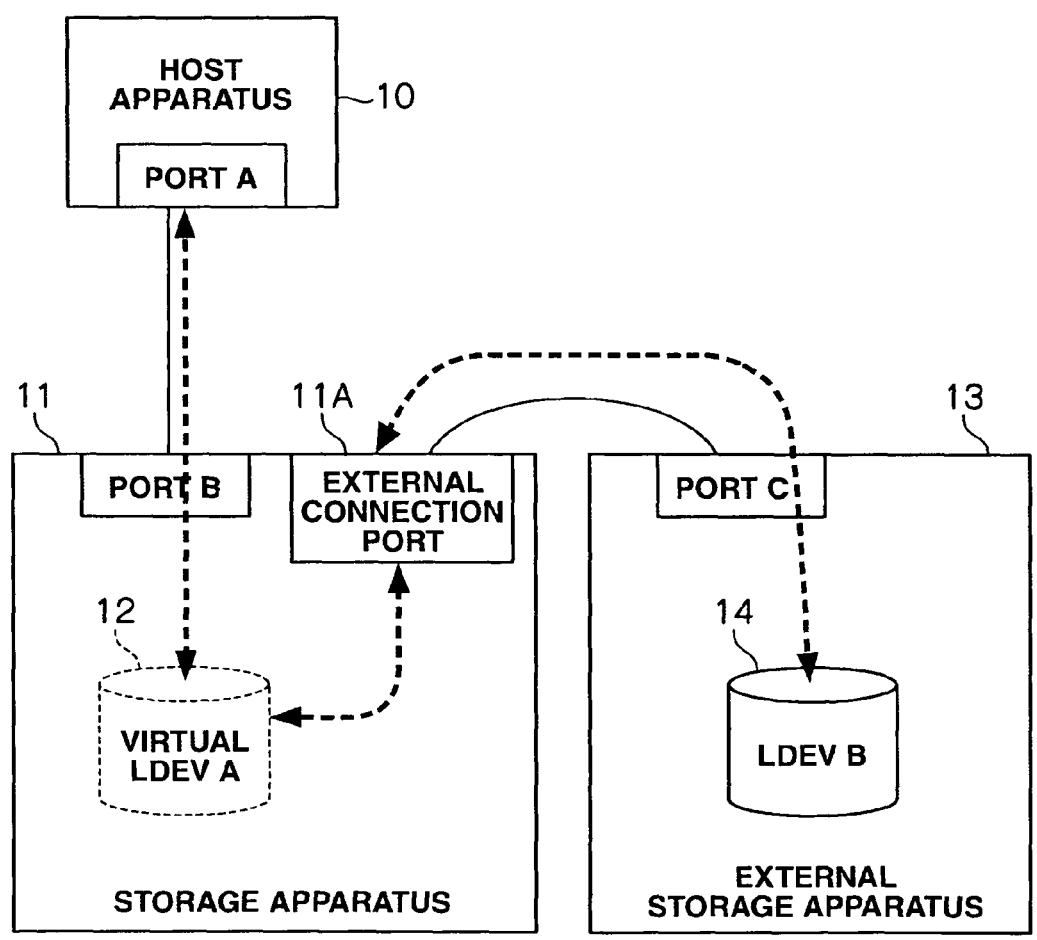
FIG. 8 is a conceptual diagram explaining the external connection function in a storage apparatus.

As shown in FIG. 8, the storage apparatus 11 equipped with the external connection function, upon executing the external connection function, maps the LDEV 14 in the external storage apparatus 13 connected to the external connection port 11A to the virtual LDEV 12 set in the self storage apparatus. When the host apparatus 10 accesses the virtual LDEV 12, the storage apparatus 11 issues a corresponding data I/O request to the external storage apparatus 13 via the external connection port 11A. Thereby, corresponding data is input to and output from the corresponding block in the LDEV 14 of the external storage apparatus 13. Accordingly, access from the host apparatus 10 to the virtual LDEV 12 is actually made to the LDEV 14 in the external storage apparatus 13.

Figure 9:
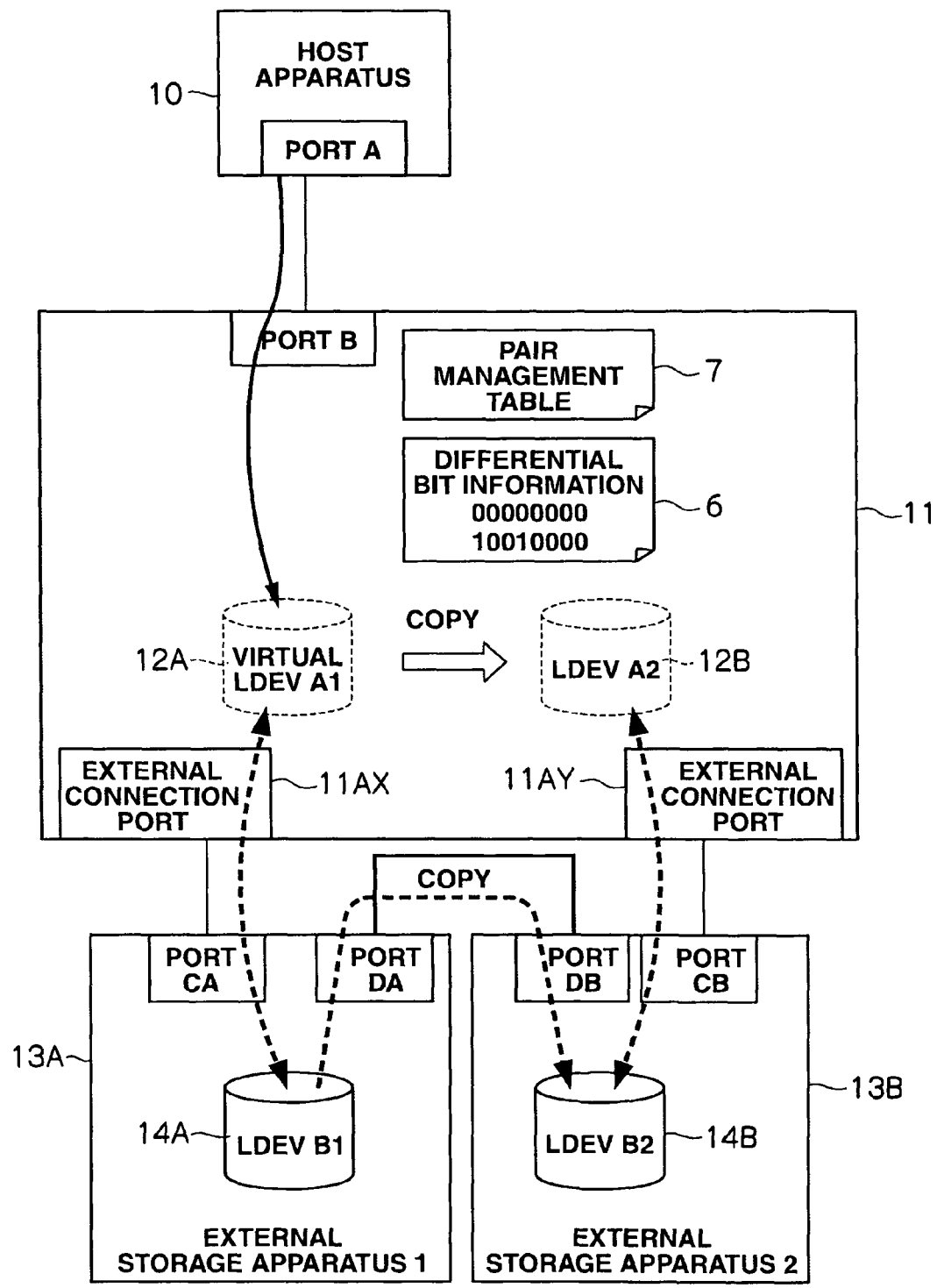
FIG. 9 is a conceptual diagram explaining the coordination of the same-chassis internal copy function and the external connection function.

It is also possible to perform data copy between two storage apparatuses by coordinating the external connection function and the same-chassis internal copy function described above. Here, as shown in FIG. 9, two external storage apparatuses 13A, 13B are connected to the storage apparatus 11 equipped with the external connection function and the same-chassis internal copy function. By using the external connection function of the storage apparatus 11, the first LDEV 14A in the first external storage apparatus 13A and the second LDEV 14B in the second external storage apparatus 13B are respectively mapped to the first and second virtual LDEVs 12A, 12B in the storage apparatus 11, and the same-chassis internal copy function is used to perform data copy between the first and second virtual LDEVs 12A, 12B.

Nevertheless, since the first and second virtual LDEVs 12A, 12B do not actually exist, the data copy from the first virtual LDEV 12A to the second virtual LDEV 12B is executed as the data copy from the first LDEV 14A to the second LDEV 14B between the first and second external storage apparatuses 13A, 13B under the control of the storage apparatus 11.

(2) Data Migration Method in Storage System

The data migration method in the storage system is now explained.

Conventionally, there are data migration methods of migrating data stored in a storage apparatus to another storage apparatus; namely, a first data migration method for performing data migration in volume (corresponds to LDEV) units by using the copy function loaded in the storage apparatus, and a second data migration method for performing data migration in file units using the copy function of an application (for instance, archive software) loaded in the host apparatus.

Figure 10:
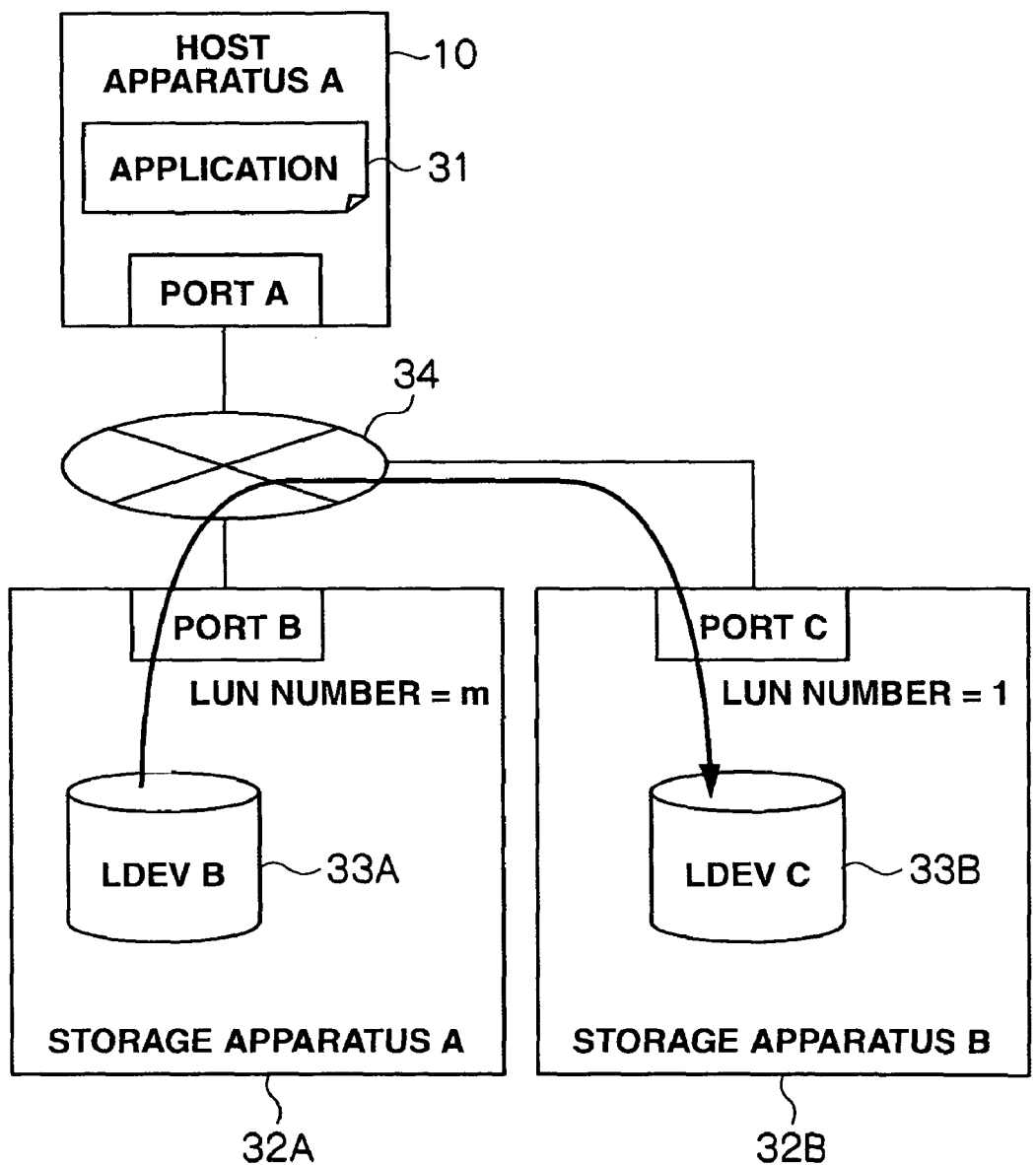
FIG. 10 is a conceptual diagram explaining a first data migration method.

Among the above, the data migration processing based on the first data migration method, as shown in FIG. 10, is performed by the host apparatus 30 remote-copying the data stored in the corresponding LDEV 33A in the migration source storage apparatus 32A to the corresponding LDEV 33B in the migration destination storage apparatus 32B via a network 34 such as a SAN (Storage Area Network) based on the application 31 loaded in the host apparatus 30.

Figure 11:
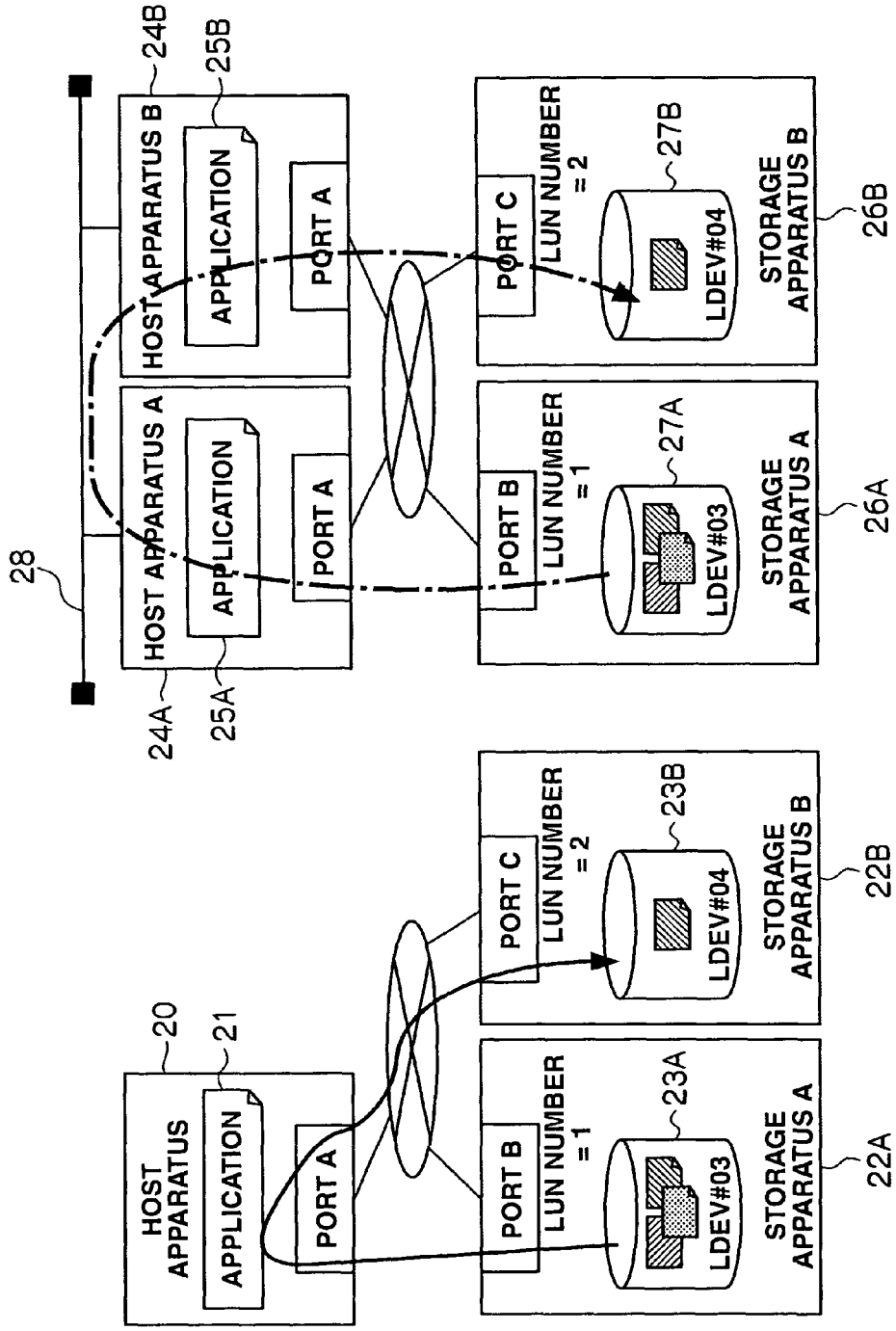
FIG. 11A and FIG. 11B are conceptual diagrams explaining a second data migration method.

The data migration processing based on the second data migration method, as shown in FIG. 11A, is performed by the host apparatus 20 reading migration target data from the corresponding LDEV 23A in the data migration source storage apparatus (hereinafter referred to as the "migration source storage apparatus") 22A, and writing such data into the corresponding LDEV 23B in the data migration destination storage apparatus (hereinafter referred to as the "migration destination storage apparatus") 22B based on the application 21 loaded in the host apparatus 20.

As another second data migration method, as shown in FIG. 11B, there is a method of using two host apparatuses 24A, 24B. The data migration processing based on this second data migration method is performed by one host apparatus 24A reading migration target data from the corresponding LDEV 27A in the migration source storage apparatus 26A and transferring this to the other host apparatus 24B via a network 28 such as a LAN (Local Area Network) based on the application 25A loaded in the host apparatus 24A on the one hand, and the host apparatus 24B writing the data into the corresponding LDEV 27B in the migration destination storage apparatus 26B based on the application 25B loaded in the host apparatus 24B on the other.

Meanwhile, the first data migration method described with reference to FIG. 10 has a drawback in that data migration can only be performed in volume units. In addition, the second data migration method described with reference to FIG. 11A has a drawback in that much time is required for the data migration since the files in the file system are migrated one at a time, and the second data migration method described with reference to FIG. 11B has a drawback in that the load on the network 28 is significant. Like this, with the conventional data migration methods described with reference to FIG. 10 and FIG. 11, there is a problem in that the data migration cannot be performed effectively.

Thus, the storage system explained with reference to the following embodiments is characterized in that the data migration method is used properly based on the status (factors) such as the data I/O status of the system or data size in order to perform the data migration effectively.

The storage system according to the present embodiment equipped with this kind of data migration function is now explained.

Figure 12:
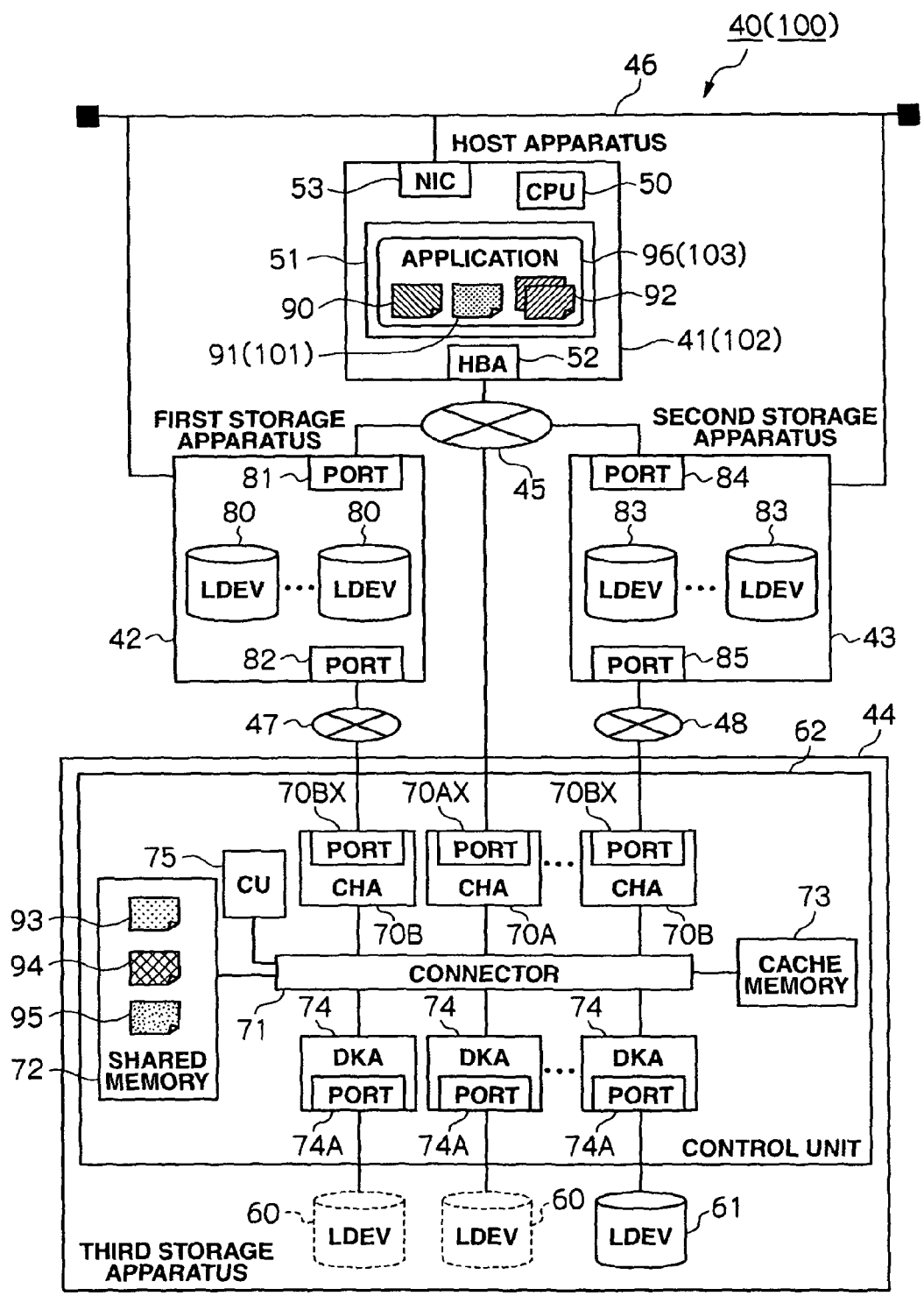
FIG. 12 is a block diagram showing the configuration of a storage system according to the first and second embodiments.

(3) First Embodiment (3-1) Configuration of Storage System in Present Embodiment FIG. 12 shows the overall storage system 40 according to the present embodiment. The storage system 40 is configured by a host apparatus 41 and first to third storage apparatuses 42 to 44 being connected via a first network 45 such as a SAN, the host apparatus 41 and the first and second storage apparatuses 42, 43 being connected via a second network 46 such as a LAN, and the first and second storage apparatuses 42, 43 being connected to a third storage apparatus 44 via a third or a fourth network 47, 48 respectively configured from a SAN or the like.

The host apparatus 41 as the higher-level apparatus is a computer system comprising information processing resources such as a CPU (Central Processing Unit) 50 and a memory 51, and, for instance, is configured from a personal computer, a workstation, or a mainframe. The host apparatus 41 comprises an information input device (not shown) such as a keyboard, a switch, a pointing device or a microphone, and an information output device (not shown) such as a monitor display or a speaker. The host apparatus 41 is provided with an HBA (Host Bus Adapter) 52 that functions as an interface for accessing the first to third storage apparatuses 42 to 44 via the first network 45, and an NIC (Network Interface Card) 53 for communicating respectively with the first and second storage apparatuses 42, 43 via the second network 46.

The third storage apparatus 44 is a storage apparatus to be used for controlling the data migration from the first storage apparatus 42 to the second storage apparatus 43, and includes an external connection function for virtualizing the LDEVs (hereinafter referred to as the "external LDEVs") 80, 83 provided by the first and second storage apparatuses 42, 43 and providing these as a virtual LDEV 60 to the host apparatus 41, and a same-chassis internal copy function for performing copy processing between the LDEVs (virtual LDEV 60 and internal LDEV 61 described later) set in the self storage apparatus. The third storage apparatus 44 comprises a plurality of physical storage devices (not shown), and a control unit 62.

As the physical storage devices among the above, for instance, expensive disks such as SCSI (Small Computer System Interface) disks or inexpensive disks such as SATA (Serial AT Attachment) disks or optical disks can be used.

These physical storage disks are operated according to a RAID format by the control unit 62. One or more LDEVs (hereinafter referred to as the "internal LDEVs") 61 are set in a physical storage area provided by one or more physical storage disks. Data is stored in block (hereinafter referred to as "logical block") units of a prescribed size in the internal LDEVs 61.

Each virtual LDEV 60 and each internal LDEV 61 are respectively assigned a unique LUN (Logical Unit Number) in the storage system 40, and a unique LDEV number in each of the first to third storage apparatuses 42 to 44. In the case of this embodiment, the input and output of data is performed by setting the combination of the LUN and a unique number (LBA: Logical Block Address) assigned to each block as the address, and designating such address.

Meanwhile, the control unit 62 comprises a plurality of first and second channel adapters 70A, 70B, a connector 71, a shared memory 72, a cache memory 73, a plurality of disk adapters 74, and a control unit 75.

Each of the first and second channel adapters 70A, 70B is configured as a microcomputer system comprising a microprocessor, a memory, a communication interface and the like. The first channel adapter 70A interprets various command sent from the host apparatus 41 via the first network 45 and executes the corresponding processing. The second channel adapter 70B comprises an initiator function capable of issuing a SCSI command, and is used for external connection.

Figure 13:
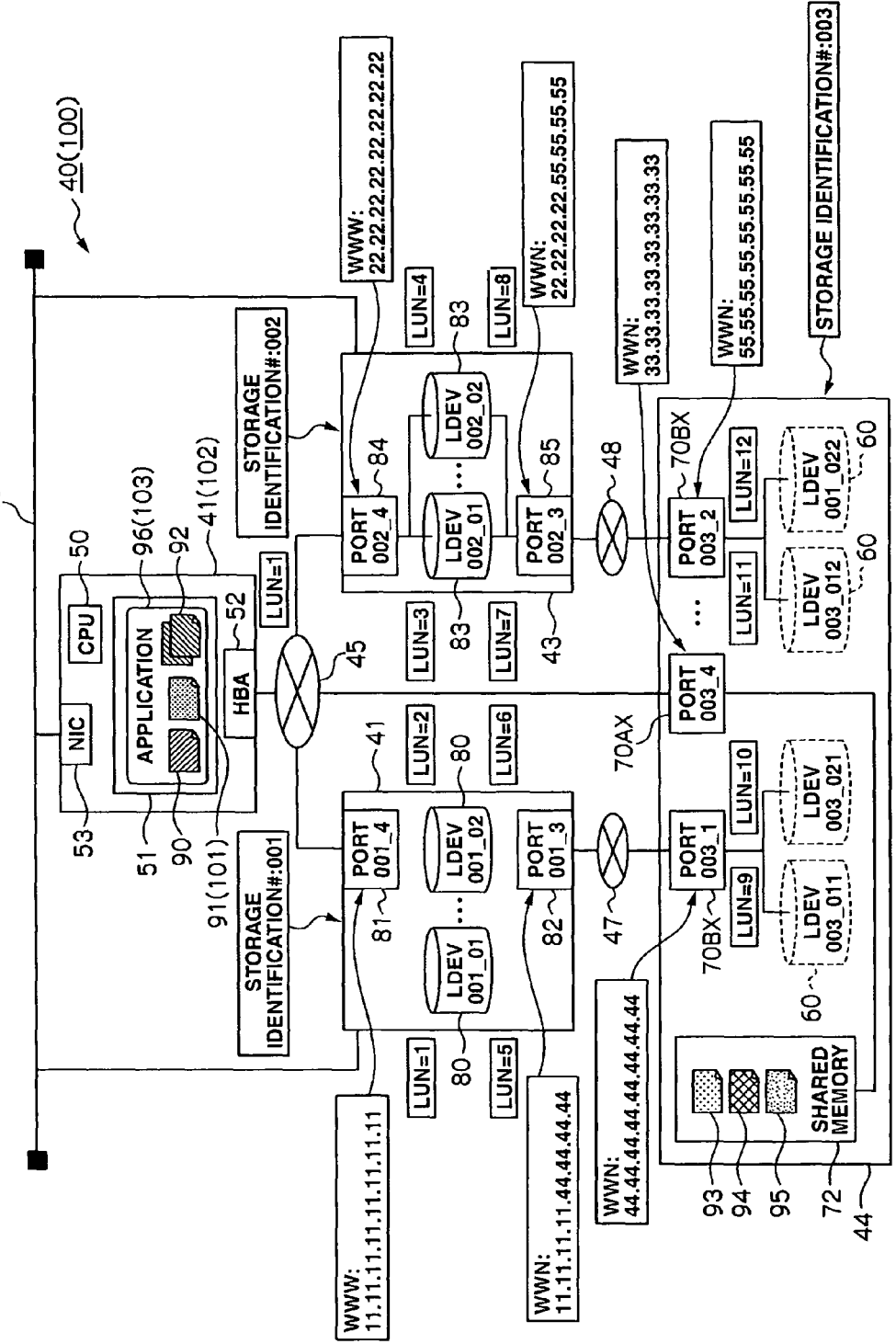
FIG. 13 is a block diagram explaining the storage system according to the first and second embodiments.

The first and second channel adapters 70A, 70B respectively comprise ports 70AX, 70BX for connecting to the corresponding first, third and fourth networks 45, 47, 48. These ports 70AX, 70BX, as shown in FIG. 13, are assigned a port address such as an IP (Internet Protocol) address or a WWN (World Wide Address) (hereinafter referred to as the "WWN") for identifying the respective ports, and the respective channel adapters 70A, 70B are able to independently function as a NAS (Network Attached Storage) based on the foregoing WWN.

The connector 71 is connected to the respective channel adapters 70A, 70B, the shared memory 72, the cache memory 73, the respective disk adapters 74, and the control unit 75. The sending and receiving of data and commands among the channel adapters 70A, 70B, the shared memory 72, the cache memory 73, the disk adapter 74 and the control units 75 are performed via the connector 71. The connector 71 is configured, for example, from a switch or a bus such as an ultra fast cross device switch for performing data transfer by way of high-speed switching.

The shared memory 72 and the cache memory 73 are memories to be shared by the channel adapters 70A, 70B and the disk adapter 74. The shared memory 72 is primarily used for storing the system configuration information concerning the configuration of the overall self storage apparatus, commands, and so on. As the shared memory 72, a nonvolatile memory, a volatile memory comprising a backup battery, a part of the hard disk drive configured as the destination for saving data, and various other configurations may be used. In this embodiment, let it be assumed that a volatile memory comprising a backup battery is used. The cache memory 73 is primarily used for temporarily storing data to be input to and output from the virtual LDEV 60 and the internal LDEV 61.

Each disk adapter 74 is configured as a microcomputer system comprising a microprocessor, a memory and so on, and controls the reading and writing of data to and from the virtual LDEV 60 and the internal LDEV 61 assigned to itself.

For example, when the disk adapter 74 receives a data write command for writing data into the virtual LDEV 60 that it is managing and the write-target data from the host apparatus 41, the disk adapter 74 transfers the corresponding write request and the write-target data to the corresponding first or second storage apparatus 42, 43 via the corresponding channel adapter 70B, and thereby writes that data in the corresponding address location of the corresponding LDEV 80, 83 in the first or second storage apparatus 42, 43. When the disk adapter 74 receives a data read command for reading data from the virtual LDEV 60 that it is managing, the disk adapter 74 transfers the corresponding read request to the corresponding first or second storage apparatus 42, 43 via the corresponding channel adapter 70B, reads the designated data from the first or second storage apparatus 42, 43, and thereby transfers such data to the host apparatus 41 via the corresponding channel adapter 70A.

Each disk adapter 74 is provided with a port 74A for connecting to the virtual LDEV 60 and the internal LDEV 61, respectively. Each port 74A, as shown in FIG. 13, is assigned a port address such as an IP address or a WWN (hereinafter referred to as the "WWN") for identifying the respective ports.

The control unit 75 has a function for controlling the overall operation of the third storage apparatus 44, and, for example, is configured from a laptop personal computer. The control unit 75 is connected to the respective channel adapters 70A, 70B and the respective disk adapters 74 via the connector 71. The control unit 75 monitors the occurrence of a failure in the third storage apparatus 44 and, when a failure occurs, displays such failure on its display, or performs close processing of the corresponding physical storage device according to the operator's operation. The operator is able to define the system configuration information using the control unit 75, and store the defined system configuration information in the shared memory 72 via the channel adapters 70A, 70B or the disk adapter 74 and the connector 71.

The first and second storage apparatuses 42, 43 have roughly the same configuration as the third storage apparatus 44 excluding the point that they are not equipped with the external connection function and the same-chassis internal copy function. The first and second storage apparatuses 42, 43 are respectively connected to the first network 45 via the ports 81, 84, and connected to the third or fourth network 47, 48 via the ports 82, 85, and perform data copy or data migration between the first and second storage apparatuses 42, 43 via the first network 45, and exchange data with the third storage apparatus 44 via the third or fourth network 47, 48.

The respective ports 81, 82, 84, 85 of the first and second storage apparatuses 42, 43, as shown in FIG. 13, are allocated with a port address such as an IP address or a WWN (hereinafter referred to as the "WWN") for identifying the respective ports.

(3-2) Data Migration Function in Storage System (3-2-1) Configuration of Various Tables and Differential Bit Information The data migration function loaded in the storage system 40 is now explained. The storage system 40 is characterized in that, upon migrating a part or all of the data in the first storage apparatus 42 to the second storage apparatus 43, the host apparatus 41 executes necessary control processing for deciding the optimal data migration method according to the status of data stored in the LDEV 80 to be subject to data migration in the first storage apparatus 42, and migrating data of the LDEV 80 to the LDEV 83 (FIG. 12) of the data migration destination in the second storage apparatus 43 based on the decided data migration method.

Specifically, the host apparatus 41 executes control processing for preferentially migrating data of the LDEV 80 in volume units by using the same-chassis internal copy function of the third storage apparatus 44 when the capacity of the LDEV 80 to be subject to data migration in the first storage apparatus 42 is large and the last update date and time of data stored in the LDEV 80 is old, and preferentially migrating data of the LDEV 80 in file units by using the copy function of the application of the host apparatus 41 when the size of the LDEV 80 to be subject to data migration is small and the last update date and time of data stored in the LDEV 80 is new.

As means for executing this kind of data migration processing, as shown in FIG. 12 and FIG. 13, the memory 51 of the host apparatus 41 stores an application program 96 comprising a mode management table 90, a storage management table 91 and a migration management table 92, and the shared memory 72 of the controller 62 of the third storage apparatus 44 stores an LDEV management table 93, a pair management table 94 and differential bit information 95.

Among the above, the mode management table 90 is a table for managing whether the data migration between the first and second storage apparatuses 42, 43 is currently being performed in volume units or file units and, as shown in FIG. 14, is configured from an LDEV migration flag column 90A and a file migration flag column 90B.

The LDEV migration flag column 90A stores a flag (hereinafter referred to as the "LDEV migration flag") representing whether the data stored in the LDEV 80 (FIG. 12) to be subject to data migration in the first storage apparatus 42 is being migrated in volume units, and the file migration flag column 90B stores a flag (hereinafter referred to as the "file migration flag") representing whether the data stored in the LDEV 80 is being migrated in file units.

The storage management table 91 is a table for managing the data migration between the first and second storage apparatuses 42, 43 and, as shown in FIG. 15, is configured from a storage identification column 91A, a WWN column 91B and a migration source/migration destination column 91C.

The storage identification column 91A stores the identification number of each storage apparatus (first to third storage apparatuses 41 to 43 in FIG. 15) connected to the self apparatus recognized by the host apparatus 41 (FIG. 12), and the WWN column 91B stores the WWN of the ports 81, 84, 70AX connected to the self apparatus in the storage apparatus.

The migration source/migration destination column 91C stores information representing whether the corresponding storage apparatus in the data migration is a migration source storage apparatus or a migration destination storage apparatus ("source" in the case of a migration source storage apparatus and "destination" in the case of a migration destination storage apparatus). The migration source/migration destination column 91C of the storage apparatus (third storage apparatus 43) externally connected to both storage apparatuses (first and second storage apparatuses 41, 42 in this embodiment) to perform data migration stores information ("external") representing this external connection.

The migration management table 92 (92-1, 92-2) is a table for managing the data migration between the first and second storage apparatuses 42, 43 for each LDEV 80, 83, and is created for each storage apparatus (first and second storage apparatuses 42, 43 in this embodiment) that performs data migration. FIG. 16A shows the migration management table 92 (92-1) for the first storage apparatus 42, and FIG. 16B shows the migration management table 92 (92-2) for the second storage apparatus 43.

The migration management tables 92, as shown in FIG. 16A and FIG. 16B, are configured from a storage identification column 92A, a LUN column 92B, an LDEV number column 92C, a capacity column 92D, a file system type column 92E, a file system name column 92F, a file system capacity column 92G, a file system mode a column 92H, a last access date and time column 92I, a last update date and time column 92J, a migration target column 92K, a copy mode column 92L, a copy status column 92M, an external storage identification column 92N, and an external LDEV number column 92P.

The storage identification column 92A stores the storage identification number of the corresponding first or second storage apparatus 42, 43, and the LUN column 92B stores the LUN assigned to each LDEV 80, 83 existing in the first or second storage apparatus 42, 43. The LDEV number column 92C stores the LDEV number of the corresponding LDEV 80, 83, and the capacity column 92D stores the capacity of the LDEV 80, 83.

Thus, FIG. 16 shows that the LDEV 80 assigned a LUN of "1" and an LDEV number of "001_01" in the first storage apparatus 42 assigned a storage identification number of "001" has a capacity of "100 G," and the LDEV 83 assigned a LUN of "3" and an LDEV number of "002_01" in the second storage apparatus 43 assigned a storage identification number of "002" also has a capacity of "100 G."

The file system type column 92E stores the type of file system stored in the LDEV 80, 83, and the file system name column 92F stores the name of the file system. The file system capacity column 92G stores the capacity set regarding the corresponding file system, and the file system mode column 92H stores information ("mount" or "unmount") representing whether the file system is mounted. If a plurality of file systems exist in one LDEV 80, 83, information is stored separately in different columns for each file system.

Thus, in FIG. 16, a file system does not exist in the LDEV 80 assigned an LDEV number of "001_01" in the first storage apparatus 42, and two file systems named "/opt" and "/usr" respectively having a capacity of "10 G" and of an "NFS" type exist in the LDEV 80 assigned an LDEV number of "001_02" in the first storage apparatus 42, and both of these file systems are mounted ("mount").

The last access date and time column 92I stores the date and time of the last access to the file system, and the last update date and time column 92J stores the date and time of the last update of the file system.

The migration target column 92K stores information representing that the corresponding LDEV 80, 83 or the file system has been designated as the copy source or the copy destination. As this information, although a flag signifying that the LDEV 80, 83 or the file system corresponding to that list is a copy source or a copy destination can be adopted, as shown in FIG. 16, if there are a plurality of LDEVs 80 or file systems to be subject to data migration, the same number (hereinafter referred to as the "migration target number") may be assigned to the copy source and the copy destination.

Thus, FIG. 16 shows a setting where data of the LDEV 80 assigned an LDEV number of "001_01" in the first storage apparatus 42 is migrated to the LDEV 83 assigned an LDEV number of "002_01" in the second storage apparatus 43, and data of the LDEV 80 assigned an LDEV number of "001_02" in the first storage apparatus 42 is migrated to the LDEV 83 assigned an LDEV number of "002_02" in the second storage apparatus 43.

The copy mode column 92L stores information representing whether the LDEV migration mode to be performed in volume units or the file migration mode to be performed in file units is set as the copy mode of the corresponding LDEV 80, 83 or the file system ("Volume" in the case of an LDEV migration mode, and "File" in the case of a file migration mode). The copy mode column 92L stores the priority of data copy together with the foregoing information. Priority of data copy will be described later.

The copy status column 92M stores information representing whether the copy of the corresponding LDEV 80, 83 or the file system is complete ("Done" if the copy the complete, and "-" if the copy is incomplete). Thus, FIG. 16 shows that while the data migration from the LDEV 80 assigned an LDEV number of "001_01" in the first storage apparatus 42 to the LDEV 83 assigned an LDEV number of "002_02" in the second storage apparatus 43 is complete, the data migration of migrating data of the file systems named "/opt" and "/usr" respectively stored in the LDEV 80 assigned an LDEV number of "001_02" in the first storage apparatus 42 to the LDEV 83 assigned with an LDEV number of "002_02" in the second storage apparatus 43 is incomplete.

The external storage identification column 92N and the external LDEV number column 92P store the storage identification number of the third storage apparatus 44 and the LDEV number of the virtual LDEV 60, respectively, when the virtual LDEVs 60 in the third storage apparatus 44 are respectively mapped to the corresponding LDEVs 80, 83. Thus, the example of FIG. 16 shows that the virtual LDEV 60 having an LDEV number of "003_011" defined in the third storage apparatus 44 assigned a storage identification number of "003" is mapped to the LDEV 80 assigned an LDEV number of "001_01" in the first storage apparatus 42.

Meanwhile, the LDEV management table 93 is a table for managing each internal LDEV 61 and virtual LDEV 60 existing in the third storage apparatus 44, and, as shown in FIG. 17, comprises an internal (virtual) LDEV field 93A and an external LDEV field 93B.

The internal (virtual) LDEV field 93A is configured from an LDEV number column 93C, a capacity column 93D and a LUN column 93E. The LDEV number column 93C stores the LDEV number of each internal LDEV 61 and virtual LDEV 60 existing in the third storage apparatus 44. The capacity column 93D stores the capacity of the corresponding internal LDEV 61 or the virtual LDEV 60, and the LUN column 93E stores the LUN assigned to that internal LDEV 61 or the virtual LDEV 60.

The external LDEV field 93B is configured from a storage identification column 93F, an LDEV number column 93G and a LUN column 93H. The storage identification column 93F stores the storage identification number of the first or second storage apparatus 42, 43 storing the external LDEV when such external LDEV (that is, LDEV 80, 83 in the first or second storage apparatus 42, 43) associated with the corresponding virtual LDEV 60 exists. The LDEV number column 93G stores the LDEV number of the external LDEV, and the LUN column 93H stores the LUN assigned to that external LDEV. Thus, the LDEV 80, 83 in which a value is stored in the external LDEV field 93B of the LDEV management table 93 is the virtual LDEV 60.

Accordingly, as shown in FIG. 17B, regarding the entry in which the LUN is stored in both the LUN column 93E of the internal (virtual) LDEV field 93A and the LUN column 93H of the external LDEV field 93B in the LDEV management table 93, real data exists in the external LDEV and is accessible from the host apparatus 41 (FIG. 12), and regarding the entry in which the LUN is stored in the LUN column 93E of the internal (virtual) LDEV field 93A but the LUN is not stored in the LUN column 93H of the external LDEV field 93B, real data exists in the internal LDEV 61 of the third storage apparatus 44, and is accessible from the host apparatus 41. The entry in which the LUN is not stored in either the LUN column 93E of the internal (virtual) LDEV field 93A and the LUN column 93H of the external LDEV field 93B is an unused LDEV set in the third storage apparatus 44, and is inaccessible from the host apparatus 41.

Figures 18, 19:
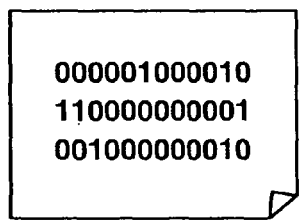
FIG. 18 is a conceptual diagram explaining a pair management table.
FIG. 19 is a conceptual diagram explaining a differential bit information.

Meanwhile, the pair management table 94 is a table for managing the configuration information of a copy pair that was pair-configured for performing the same chassis internal copy processing in the third storage apparatus 44 and, as shown in FIG. 18, is configured from a pair number column 94A, a primary LDEV number column 94B, a secondary LDEV number column 94C and a pair status column 94D.

The pair number column 94A stores the pair number as a unique number assigned to the corresponding copy pair, and the primary LDEV number column 94B stores the LDEV number of the LDEV (internal LDEV 61, external LDEV 60) in the third storage apparatus 44 forming the primary LDEV of the copy pair. The secondary LDEV number column 94C stores the LDEV number of the LDEV (internal LDEV 61, external LDEV 60) in the third storage apparatus 44 forming the secondary LDEV of the copy pair, and the pair status column 94D stores the current pair status of the copy pair ("pair," "copy" or "split").

The differential bit information 95, as shown in FIG. 19, is a bit sequence configured from the same number of bits as the number of blocks of LDEVs forming the primary LDEV and the secondary LDEV of the corresponding copy pair, and "1" is set to bits corresponding to blocks in which the data of the primary LDEV and the data of the secondary LDEV are different, and "0" is set to bits corresponding blocks in which the data of the primary LDEV and the data of the secondary LDEV are the same. The differential bit information 95 exists in a quantity that is the same as the number of copy pairs in correspondence with the respective copy pairs registered in the pair management table 94.

(3-2-2) Flow of Data Migration Processing in Present Embodiment

Figure 20:
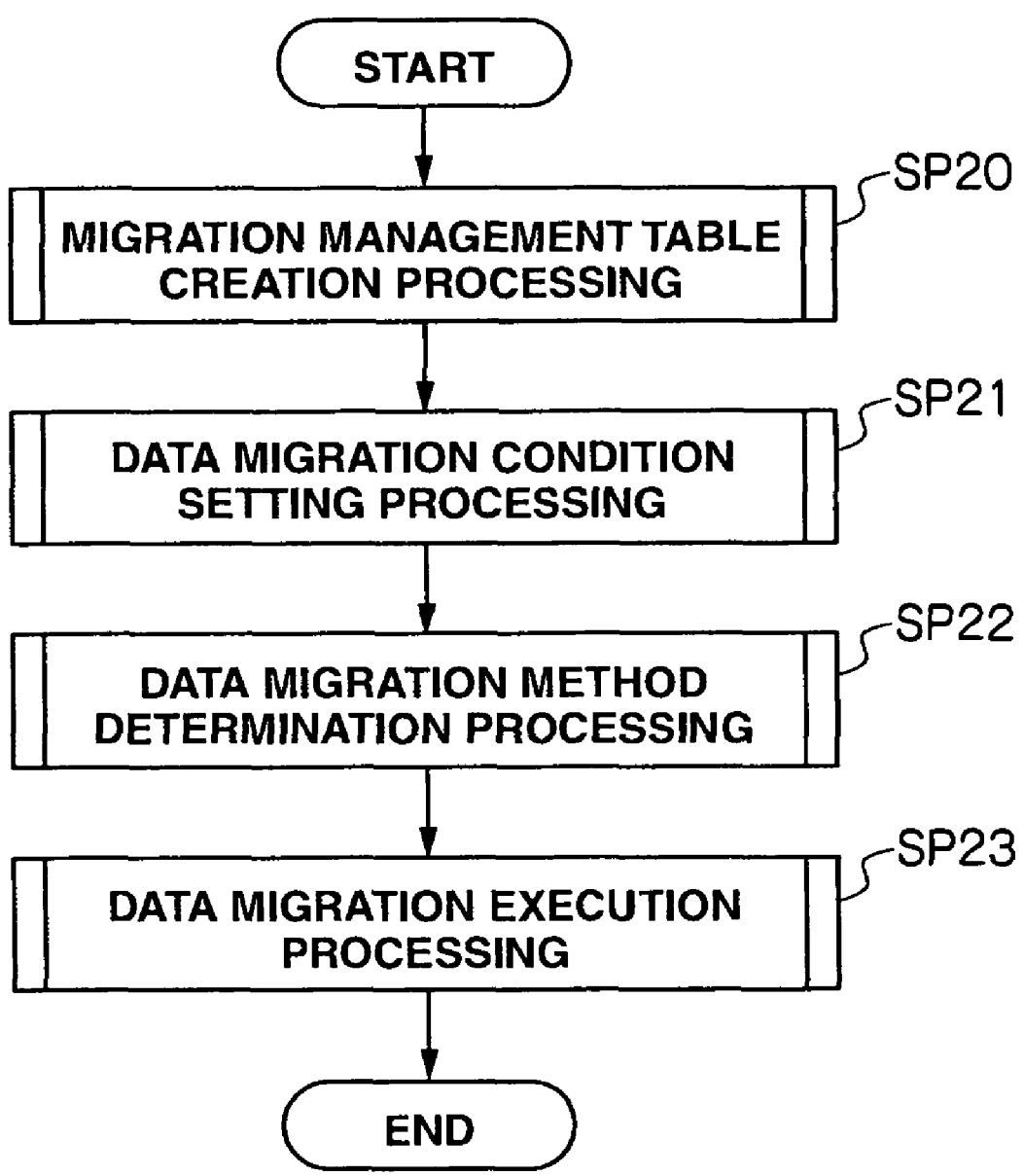
FIG. 20 is a flowchart showing the processing routine of data migration processing.

FIG. 20 shows the processing flow of the CPU 50 (FIG. 12) of the host apparatus 41 concerning the data migration from the first storage apparatus 42 to the second storage apparatus. In the ensuing explanation, let it be assumed that the LDEVs 80, 83 in the first and second storage apparatuses 42, 43 are recognized by the host apparatus 41, and mapped to one of the virtual LDEVs 60 in the third storage apparatus 44.

When the CPU 50 of the host apparatus 41 receives an input of an execution command of the data migration processing from the system administrator, it starts the data migration processing shown in FIG. 20, and foremost creates the migration management table explained with reference to FIG. 16 (SP20). Subsequently, the CPU 50 sets the storage apparatus of the data migration source and the storage apparatus of the data migration destination (respectively the first storage apparatus 42 and the second storage apparatus 43) in the storage management table 91 explained with reference to FIG. 15, and sets the respective LDEVs 80, 83 or the file system of the data migration source and the data migration destination in the migration management table 92 (SP21).

Subsequently, the CPU 50 decides the data migration method to be used for data migration regarding the LDEV 80 or the file system to be subject to data migration (SP22), and thereafter controls the first and second storage apparatuses 42, 43 so as to migrate the data of the LDEV 80 or the file system to be subject to data migration in the first storage apparatus 42 to the corresponding LDEV 83 in the second storage apparatus 43 using the data migration method decided at step SP22 (SP23).

The specific contents of the data migration processing according to the present embodiment are now explained.

(3-2-3) Migration Management Table Creation Processing (Step SP20 of FIG. 20)

The creation processing of the migration management table 92 to be performed at step SP20 in the data migration processing is foremost explained. This migration management table creation processing is performed according to the processing routine shown in FIG. 21 based on the application program 96 (FIG. 12) stored in the memory 51 (FIG. 12) of the host apparatus 41.

Figure 21:
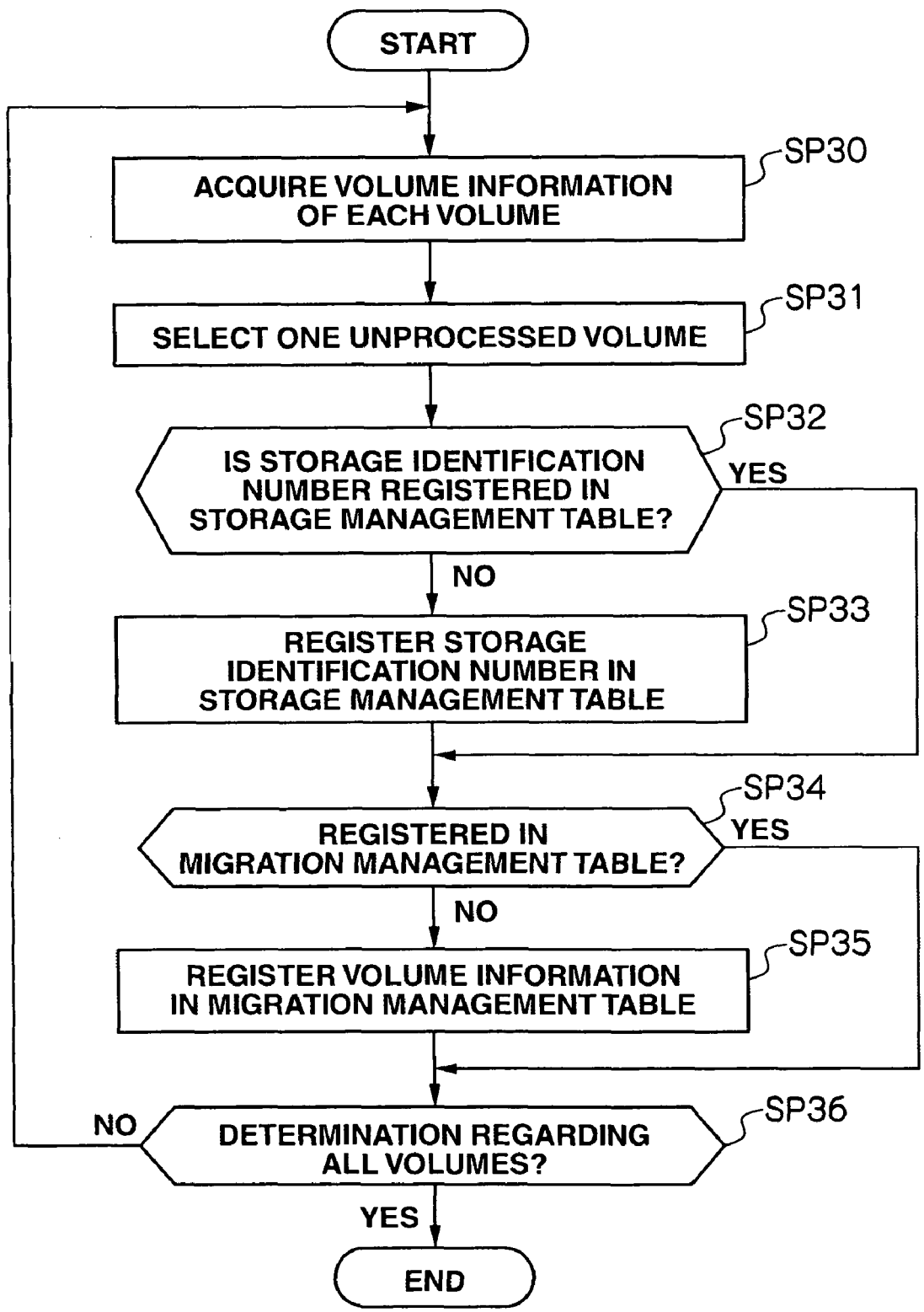
FIG. 21 is a flowchart explaining the specific processing contents of the CPU of a host apparatus concerning the migration management table creation processing.

Specifically, when the CPU 50 of the host apparatus 41 proceeds to step SP20 of the data migration processing explained with reference to FIG. 20, it starts the migration management table creation processing shown in FIG. 21, and foremost acquires information (hereinafter referred to as the "LDEV information") concerning the respective LDEVs 80, 83 provided by the storage apparatuses (first and second storage apparatuses 42, 43 in this example) connected to the host apparatus 41 recognized by the OS of the host apparatus 41 based on an OS (Operation System) command or the like, and temporarily stores the acquired LDEV information of the respective LDEVs 80, 83 in the memory 51 (SP30).

Subsequently, the CPU 50 selects one unprocessed LDEV 80, 83 based on the LDEV information of each LDEV 80, 83 acquired at step SP30 (SP31), and determines whether the storage identification number of the storage apparatus (first or second storage apparatus 42, 43) retaining the LDEVs 80, 83 is registered in the storage management table 91 (FIG. 15) (SP32). In the initial state, since the storage management table 91 is not storing any information, a positive result will always be obtained in the determination at step SP32.

If the CPU 50 obtains a positive result in this determination, it proceeds to step SP34, and if the CPU 50 obtains a negative result in this determination, it registers the storage identification number of the storage apparatus (first or second storage apparatus 42, 43) in the storage management table 91 (SP33).

Subsequently, the CPU 50 determines whether the LDEV 80, 83 selected at step SP31 is registered in the migration management table 92 (FIG. 16) (SP34). If the CPU 50 obtains a positive result in this determination, it proceeds to step SP36, and if the CPU obtains a negative result in this determination, it registers the necessary information concerning the LDEV 80, 83 in the corresponding migration management table 92 (SP35).

In the initial state, a migration management table 92 does not exist for each storage apparatus (first and second storage apparatuses 42, 43) connected to the host apparatus 41. Thus, in this case, the CPU 50 creates a new migration management table 92 storing no information at step SP35, and stores the LDEV information of the corresponding LDEV 80, 83 in that migration management table 92.

The CPU 50 thereafter determines whether the processing of step SP31 to step SP35 has been performed to all LDEVs 80, 83 in which the LDEV information was acquired at step SP30 (SP36). If the CPU 50 obtains a negative result in this determination, it returns to step SP31 and thereafter repeats the same processing (SP31 to SP36-SP31).

If the CPU 50 obtains a positive result at step SP36 as a result of the processing of step SP31 to step SP35 being eventually performed to all LDEVs 80, 83 in which the LDEV information was acquired at step SP30, it ends this migration management table creation processing.

The appearance of the storage management table 91 immediately after being created based on the migration management table creation processing is shown in FIG. 22, and the appearances of the migration management tables 92-1, 92-2 corresponding respectively to the migration source storage apparatus (first storage apparatus 42) and the migration destination storage apparatus (second storage apparatus 43) immediately after being created based on the migration management table creation processing are shown in FIG. 23A and FIG. 23B, respectively.

(3-2-4) Data Migration Condition Setting Processing (Step SP21 of FIG. 20)

Figures 24, 25:
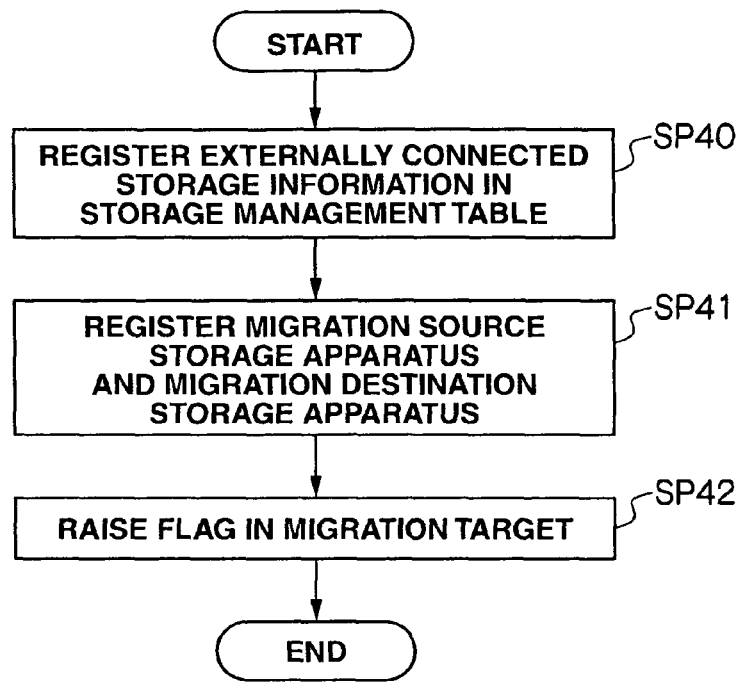
FIG. 24 is a flowchart explaining the specific processing contents of the CPU of a host apparatus concerning the data migration condition setting processing according to the first embodiment.
FIG. 25 is a conceptual diagram explaining a storage management table during the data migration condition setting processing.

Meanwhile, when the CPU 50 proceeds to step SP21 of the data migration processing explained with reference to FIG. 20, it executes the data migration condition setting processing shown in FIG. 24 based on the application program 96 stored in the memory 51.

Specifically, when the CPU 50 proceeds to step SP21 of the data migration processing explained with reference to FIG. 20, it starts this data migration condition setting processing, and foremost registers the storage identification number and the WWN of the external storage apparatus (third storage apparatus 44), to which the migration source storage apparatus (first storage apparatus 42) and the migration destination storage apparatus (second storage apparatus 43) are connected externally and respectively, in the storage management table 91 according to the setting input by the system administrator (SP40).

Subsequently, the CPU 50 registers the migration source storage apparatus and the migration destination storage apparatus in the storage management table 91 according to the setting input by the system administrator (SP41). Specifically, the CPU 50, as shown in FIG. 25, stores the code of "source" in the migration source/migration destination column 91C corresponding to the migration source storage apparatus in the storage management table 91 and stores the code of "destination" in the migration source/migration destination column 91C corresponding to the migration destination storage apparatus in the storage management table 91, respectively. The CPU 50 additionally stores the code of "external" in the migration source/migration destination column 91C corresponding to the external storage apparatus.

Subsequently, the CPU 50, as shown in FIG. 26A and FIG. 26B, stores the migration target number in the migration target column 92K of the row (hereinafter referred to as the "list") in the migration management table 92 corresponding respectively to each LDEV 80, 83 or the file system of the data migration source and the data migration destination in each migration management table 92 (92-1, 92-2) according to the setting input by the system administrator (SP42), and thereafter ends this data migration condition setting processing.

(3-2-5) Data Migration Method Determination Processing (Step SP22 of FIG. 20)

Meanwhile, when the CPU 50 proceeds to step SP22 of the data migration processing explained with reference to FIG. 20, it executes the data migration method determination processing shown in FIG. 27 based on the application program 96 stored in the memory 51.

Figure 27:
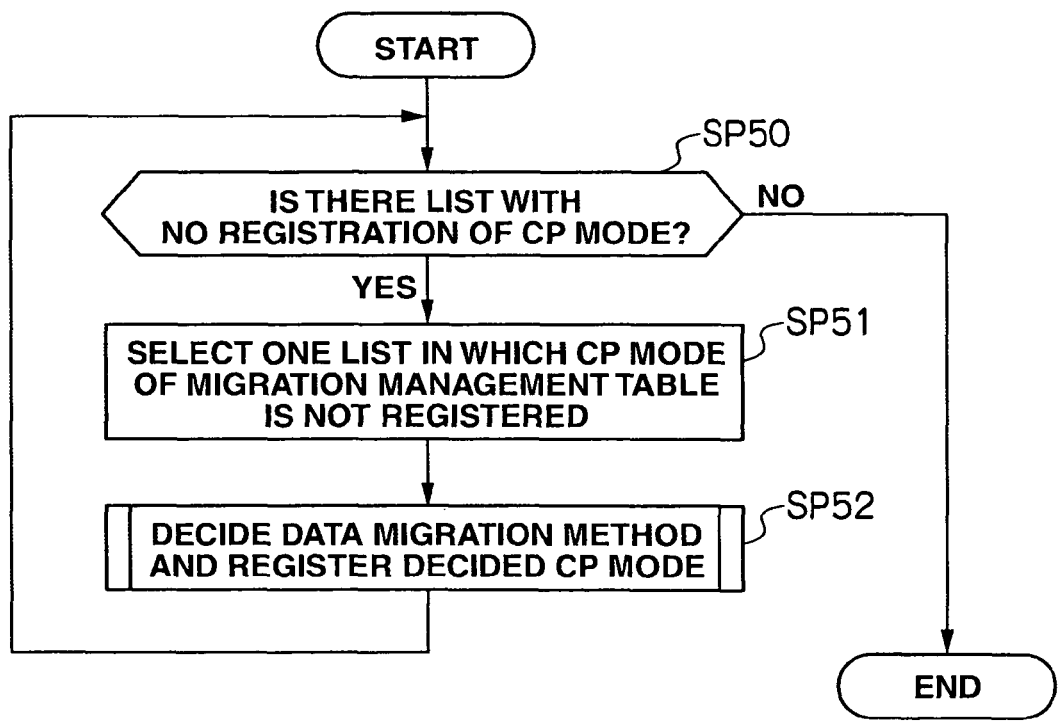
FIG. 27 is a flowchart explaining the specific processing contents of the CPU of a host apparatus concerning the data migration method determination processing.

Specifically, when the CPU 50 proceeds to step SP22 of the data migration processing, it starts the data migration method determination processing shown in FIG. 27, and foremost determines whether there is a list in which a copy mode is not registered in the copy mode column 92L among the lists in which the migration target number of the migration management table 92 (FIG. 26A) corresponding to the migration source storage apparatus (first storage apparatus 42) is stored in the migration target column 92K (SP50).

If the CPU 50 obtains a positive result in this determination, it selects one list among the foregoing lists (SP51). Subsequently, the CPU 50 decides the data migration method of data stored in the LDEV 80 corresponding to that list, thereafter registers the decided data migration method in the copy mode column 92L of that list (SP52), and then returns to step SP50.

The CPU 50 thereafter repeats the same processing (SP50 to SP52-SP50), and, upon eventually completing the registration of the copy mode in the copy mode column 92L of all lists storing the migration target number in the migration target column 92K of the migration management table 92, ends this data migration method determination processing.

Figure 28:
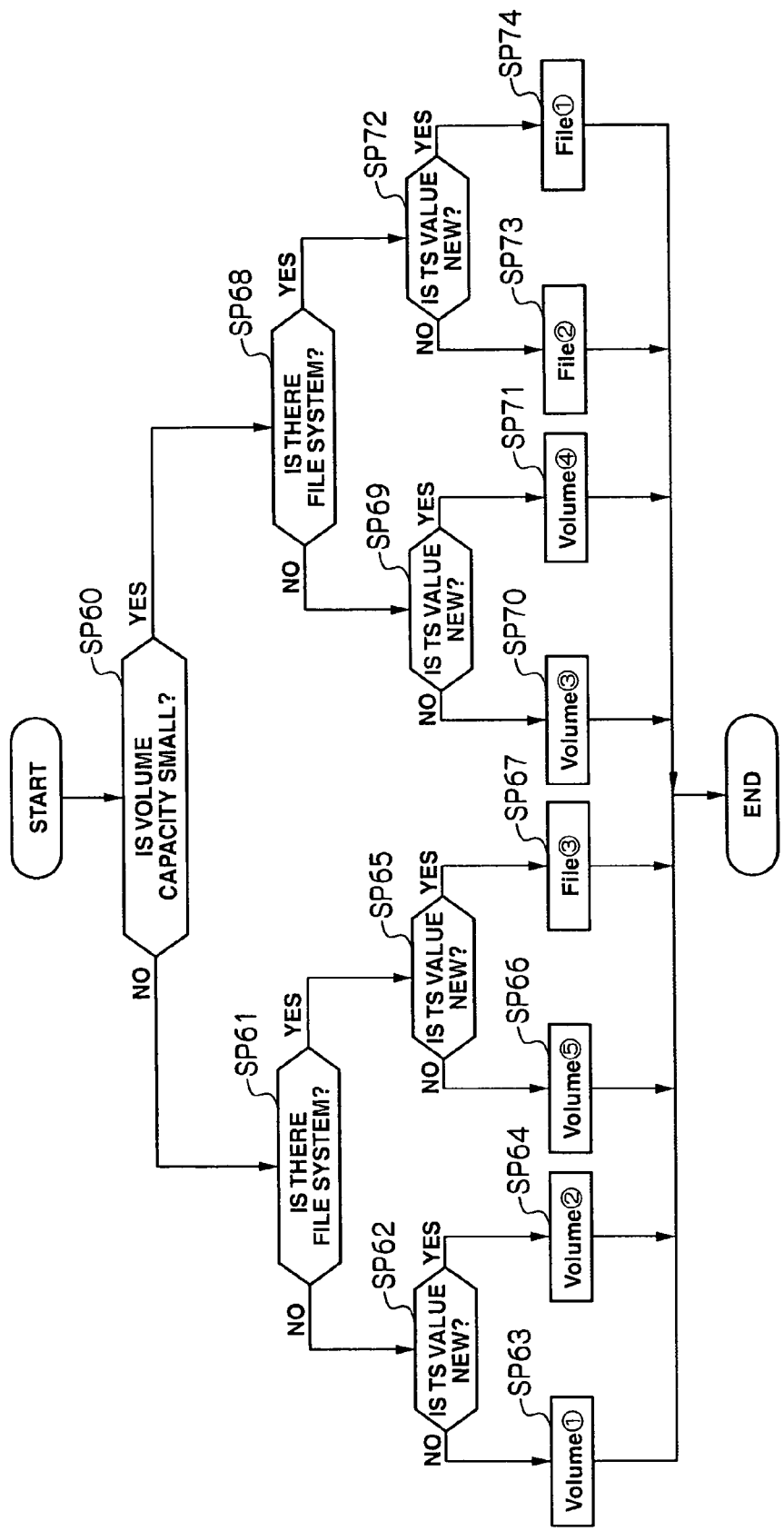
FIG. 28 is a flowchart explaining the specific processing contents of the CPU of a host apparatus concerning the migration processing determination processing.

The specific processing routine of step SP52 in the data migration method determination processing is shown in FIG. 28. When the CPU 50 proceeds to step SP52 of the data migration method determination processing, it starts this migration method determination processing, and foremost refers to the capacity column 92D of the target list in the migration management table 92 corresponding to the migration source storage apparatus (first storage apparatus 42), and determines whether the capacity of the corresponding LDEV 80 is smaller than a predetermined threshold value (SP60).

If the CPU 50 obtains a negative result in this determination, it determines whether data of the file system is stored in the LDEV 80 based on whether information is stored in the file system name column 92F or the like of that list in the migration management table 92 (SP61).

If the CPU 50 obtains a negative result in this determination, it refers to the last update date and time column 92I of that list in the migration management table 92, and determines whether the date and time of the last update is older than the date and time going back a predetermined period from the current date and time (in other words, whether the date and time of the latest time stamp among the time stamps given to each data is older than the date and time going back a predetermined period from the current date and time) (SP62).

Whether the CPU 50 obtains a negative result or a positive result in this determination, it decides the data migration method in volume units as the data migration method of data stored in the LDEV 80 (SP63, SP64), and thereafter ends this migration method determination processing.

If the CPU 50 obtains a positive result in the determination at step SP61, and, as with step SP62, determines whether the date and time of the last update is older than the date and time going back a predetermined period from the current date and time (SP65).

If the CPU 50 obtains a positive result in this determination, it decides the data migration method in volume units as the data migration method of data stored in the LDEV 80 (SP66), and if the CPU 50 obtains a negative result in this determination, it decides the data migration method in file units as the data migration method of data stored in the LDEV 80 (SP67), and thereafter ends this migration method determination processing.

Like this, as a general rule, the CPU 50 selects the data migration method in volume units as the data migration method if the capacity of the LDEV 80 to be subject to data migration is large. However, even in this case, if the last update date and time is new, since there is a possibility that the file stored in the LDEV 80 will be accessed again in the near future, the data migration method in file units is selected as the data migration method.

Meanwhile, if the CPU 50 obtains a positive result in the determination at step SP60, as with step SP61, it determines whether data of the file system is stored in the LDEV 80 corresponding to the target list (SP68).

If the CPU 50 obtains a negative result in this determination, as with step SP62, it determines whether the date and time of the last update is older than the date and time going back a predetermined period from the current date and time (SP69).

Whether the CPU 50 obtains a negative result or a positive result in this determination, it decides the data migration method in volume units as the data migration method of data stored in that LDEV 80 (SP70, SP71), and thereafter ends this migration method determination processing.

If the CPU 50 obtains a positive result in the determination at step SP68, as with step SP62, it determines whether the date and time of the last update is older than the date and time going back a predetermined period from the current date and time (SP72).

Whether the CPU 50 obtains a negative result or a positive result in this determination, it selects the data migration method in file units as the data migration method of data stored in that LDEV 80 (SP73, SP74), and thereafter ends this migration method determination processing.

If the capacity of the LDEV 80 to be subject to data migration is smaller than the threshold value, as a general rule, the CPU 50 selects the data migration method in file units as the data migration method. However, even in this case, if a file system is not stored in the LDEV 80, since data migration cannot be performed in file units, the data migration method in volume units is selected as the data migration method.

The circled numbers behind "Volume" and "File" at step SP63, step SP64, step SP66, step SP67, step SP70, step SP71, step SP73 and step SP74 in FIG. 28 show the priority. This priority is a numerical value representing the priority order upon migrating the data of the corresponding LDEV 80 or the file system, and is independently decided for each volume group to perform data migration in volume units and for each volume group to perform data migration in file units. In FIG. 28, lower the numerical value of the circled number, the higher the priority order. The order of data migration based on this priority will be described later.

Figure 29:
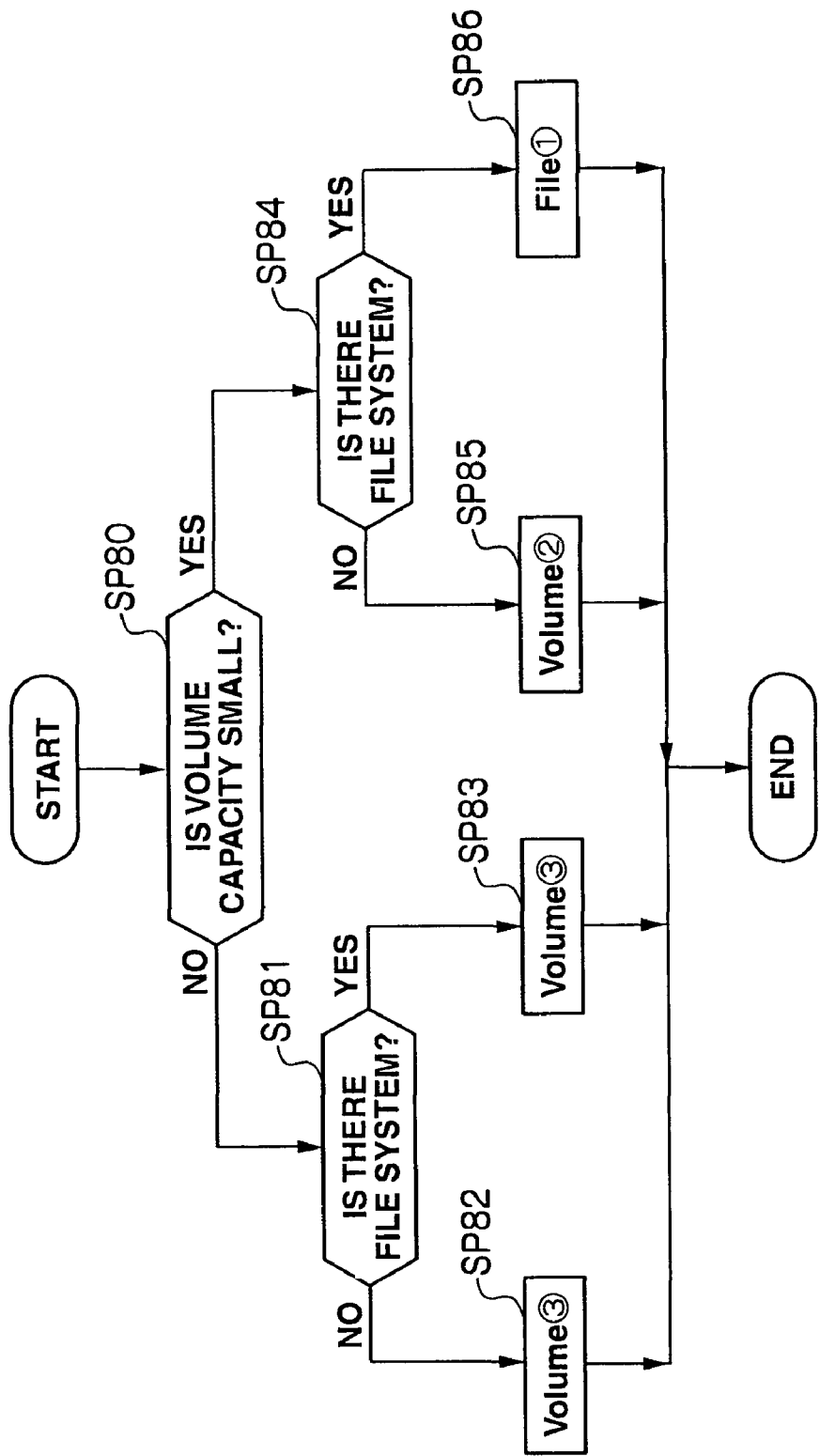
FIG. 29 is a flowchart explaining the specific processing contents of the CPU of a host apparatus concerning the migration processing determination processing in a case where the storage system is an archive system.

The specific processing contents of the migration method determination processing to be performed at step SP52 of the data migration method determination processing (FIG. 27) in a case where the data stored in the LDEV 80 to be subject to data migration processing is data to be archived (archive data) are shown in FIG. 29. Here, generally speaking, since the data stored in the LDEV 80 to be subject to data migration will not be updated, the CPU 50 will decide the data migration method and priority order as follows.

Specifically, when the CPU 50 proceeds to step SP52 of the data migration method determination processing, it starts the migration method determination processing, and foremost refers to the capacity column 92D of the target list in the migration management table 92 corresponding to the migration source storage apparatus (first storage apparatus 42), and determines whether the capacity of the corresponding LDEV 80 is smaller than a predetermined threshold value (SP80).

If the CPU 50 obtains a negative result in this determination, it refers to the file system mode column 92H of the list in the migration management table 92, and determines whether a file system is stored in that LDEV 80 (SP81).

Whether the CPU 50 obtains a negative result or a positive result in this determination, it decides the data migration method in volume units as the data migration method of data stored in that LDEV 80 (SP82, SP83), and thereafter ends this migration method determination processing.

Like this, the CPU 50 selects the data migration method in volume units as the data migration method regardless of the existence of a file system if the LDEV capacity is large.

Meanwhile, if the CPU 50 obtains a positive result in the determination at step SP80, as with step SP81, it determines whether a file system is stored in that LDEV 80 (SP84).

If the CPU 50 obtains a negative result in this determination, it decides the data migration method in volume units as the data migration method of data stored in that LDEV 80 (SP85), and if the CPU 50 obtains a positive result in this determination, it decides the data migration method in file units as the data migration method of data stored in that LDEV 80 (SP86), and thereafter ends this migration method determination processing.

Like this, when the LDEV capacity is small, the CPU 50 selects the data migration method in volume units as the data migration method if a file system exists in the LDEV 80, and selects the data migration method in file units as the data migration method if a file system does not exist in the LDEV 80.

(3-2-6) Data Migration Execution Processing (Step SP23 of FIG. 20)

When the CPU 50 proceeds to step SP23 of the data migration processing explained with reference to FIG. 20, it executes the data migration execution processing shown in FIG. 30 based on the application program 96 stored in the memory 51.

Specifically, when the CPU 50 proceeds to step SP23 of the data migration processing, it starts this data migration execution processing, and foremost confirms which storage apparatus (first storage apparatus 42 in this example) is the migration source storage apparatus based on the storage management table 91, and determines whether there is a list in which the information of "Done" representing that the data migration is incomplete (that is, whether there is a list in which the data migration of the corresponding LDEV 80 or the file system is incomplete) is not stored in the copy status column 92M among the lists (rows) storing the migration target number in the migration target column 92K regarding the migration management table 92 corresponding to the migration source storage apparatus (SP90)

If the CPU 50 obtains a positive result in this determination, it selects one list having the smallest priority order stored in the copy mode column 92L among the corresponding lists (SP91), stores "Volume" in the copy mode column 92L regarding that list, and determines whether the LDEV migration flag of the mode management table 90 (FIG. 14) is set to "OFF" (that is, whether copying in volume units is set as the copy mode, and whether data of any one of the LDEVs 80 is currently being transferred from the migration source storage apparatus to the migration destination storage apparatus) (SP92).

If the CPU 50 obtains a positive result in this determination, it sets the LDEV migration flag in the mode management table 90 to "ON" (SP93), and thereafter controls the external storage apparatus (third storage apparatus 44) so as to execute data migration processing in volume units regarding the corresponding LDEV 80 by using the same-chassis internal copy function of the external storage apparatus (SP94). The CPU 50 thereafter re-sets the LDEV migration flag in the mode management table 90 to "OFF" (SP95), and then returns to step SP90.

Meanwhile, if the CPU 50 obtains a negative result in the determination at step SP92, it determines whether "File" is stored in the copy mode column 92L regarding that list and whether the file migration flag of the mode management table 90 is set to "OFF" (that is, whether copying in file units is set as the copy mode, and whether data of any one of the file systems is currently being transferred from the migration source storage apparatus to the migration destination storage apparatus) (SP96).

If the CPU 50 obtains a negative result in this determination, it returns to step SP90, and if the CPU 50 obtains a positive result in this determination, it sets the file migration flag in the mode management table 90 to "ON" (SP97), and executes the data migration processing in volumes units regarding the corresponding LDEV 80 by using the copy function of the application 96 (FIG. 12) (SP98). The CPU 50 thereafter re-sets the LDEV migration flag in the mode management table 90 to "OFF" (SP99), and then returns to step SP90.

The CPU 50 thereafter repeats the same processing (SP90 to SP99-SP90). Here, the CPU 50 selects the lists in order from the smallest priority order (randomly if the priority order is the same) stored in the copy mode column 92L regardless of whether the copy mode is "Volume" or "File" upon selecting the lists at step SP91. Thereby, data of the LDEV 80 corresponding respectively to each list in which the copy mode is set to "Volume" is copied from the migration source storage apparatus to the migration destination storage apparatus in order from the smallest priority order according to the same-chassis internal copy function of the external storage apparatus (third storage apparatus 44), and concurrently therewith, data of the file system corresponding respectively to each list in which the copy mode is set to "File" is copied from the migration source storage apparatus to the migration destination storage apparatus based on the copy function of the application program 96 of the host apparatus 41.

If the CPU 50 obtains a positive result at step SP90 as a result of the migration of data corresponding to each list storing the migration target number in the migration target column 92K of the migration management table 92 eventually being complete, it ends this data migration processing.

The flow of the data copy processing in volume units (hereinafter referred to as the "volume unit data copy processing") to be performed at step SP93 of the data migration execution processing is now explained with reference to FIG. 31.

Here, the CPU 50 of the host apparatus 41 refers to the storage management table 91, and confirms which storage apparatus is the external storage apparatus externally connected to the migration source storage apparatus and the migration destination storage apparatus, respectively.

Subsequently, the CPU 50 requests the external storage apparatus to transfer the detailed information (hereinafter referred to as the "virtual LDEV detailed information") concerning the virtual LDEV 60 (FIG. 12) in the external storage apparatus mapped to the LDEV 80 (FIG. 12) of the data migration source, and the virtual LDEV 60 in the external storage apparatus mapped to the data LDEV 83 (FIG. 12) of the migration destination (SP100).

Specifically, the CPU 50 refers to the storage management table 91 and specifies the migration destination storage apparatus, and refers to the migration target column 92K of each list in the migration management table 92 corresponding to the migration destination storage apparatus so as to detect the LDEV number of the LDEV 83 of the data migration destination. The CPU 50 notifies the obtained storage identification number of the migration destination storage apparatus and the LDEV number of the LDEV 83 of the data migration destination to the external storage apparatus, and thereby requests the transfer of the virtual LDEV detailed information of the virtual LDEV 60 mapped to the LDEV 83 of the data migration destination in the external storage apparatus.

Similarly, the CPU 50 notifies the storage identification number stored in the storage identification column 92N of the list selected at step SP91 of the data migration execution processing (FIG. 30) and the LDEV number stored in the LDEV number column 92C of that list to the external storage apparatus, and thereby requests the transfer of the virtual LDEV detailed information of the virtual LDEV 60 mapped to the LDEV 80 of the data migration source in the external storage apparatus.

The external storage apparatus that received this request extracts the LDEV number, capacity and LUN of each virtual LDEV 60 corresponding to each LDEV 83, 80 of the data migration source and the data migration destination from the LDEV management table 93 (FIG. 17), and sends such information as the virtual LDEV detailed information to the host apparatus 41 (SP101).

When the CPU 50 of the host apparatus 41 receives the virtual LDEV detailed information, it updates the migration management table 92 corresponding to the migration source storage apparatus and the migration management table 92 corresponding to the migration destination storage apparatus based on the virtual LDEV detailed information (SP102).

Specifically, the CPU 50, as shown in FIG. 32, stores the storage identification number of the external storage apparatus in the external storage identification column 92N of the target list in the migration management table 92 corresponding to the migration source storage apparatus 42, and stores the LDEV number of the virtual LDEV 60 associated with the LDEV 80 of the data migration source recognized based on the virtual LDEV detailed information in the external LDEV number column 92P of that list. The CPU 50 additionally stores the storage identification number of the external storage apparatus in the external storage identification column 92N of the target list in the migration management table 92 corresponding to the migration destination storage apparatus 43, and stores the LDEV number of the virtual LDEV 60 associated with the LDEV 83 of the data migration destination recognized based on the virtual LDEV detailed information in the external LDEV number column 92P of that list.

The CPU 50, based on the migration management table 92 (92-1) corresponding to the updated migration source storage apparatus and the migration management table 92 (92-2) corresponding to the updated migration destination storage apparatus, issues a same chassis internal copy execution command (hereinafter referred to as the "same chassis internal copy execution command") to the external storage apparatus for copying data from the virtual LDEV 60 associated with the LDEV 80 of the data migration source to the virtual LDEV 60 associated with the LDEV 83 of the data migration destination (SP103).

Consequently, the external storage apparatus controls the migration source storage apparatus (first storage apparatus 42) and the migration destination storage apparatus (second storage apparatus 43) based on the same chassis internal copy execution command, and thereby executes the copy of data from the LDEV 80 of the data migration source to the LDEV 83 of the data migration destination in volume units (SP104).

In reality, the migration source storage apparatus sequentially reads the data of the LDEV 80 of the data migration source, and transfers such data to the migration destination storage apparatus via the first network 45. The migration destination storage apparatus sequentially stores the data sent from the migration source storage apparatus in the LDEV 83 of the data migration destination.

When this copy is complete, the external storage apparatus notifies such copy completion to the host apparatus 41 (SP105), and thereafter ends this data migration processing.

When the CPU 50 of the host apparatus 41 receives this notice, as shown in FIG. 32, it updates the migration management table 92 corresponding to the migration source storage apparatus and the migration management table 92 corresponding to the migration destination storage apparatus, respectively (SP105). Specifically, the CPU 50 stores "Done" representing the copy completion in the copy status column 92M of the corresponding list in the migration management table 92 corresponding to the migration source storage apparatus and the migration management table 92 corresponding to the migration destination storage apparatus. The CPU 50 additionally stores the code of "Done" representing the copy completion in the copy mode column 92L of the corresponding list regarding the migration management table 92 corresponding to the migration destination storage apparatus. The volume unit data copy processing is ended thereby.

Figure 30:
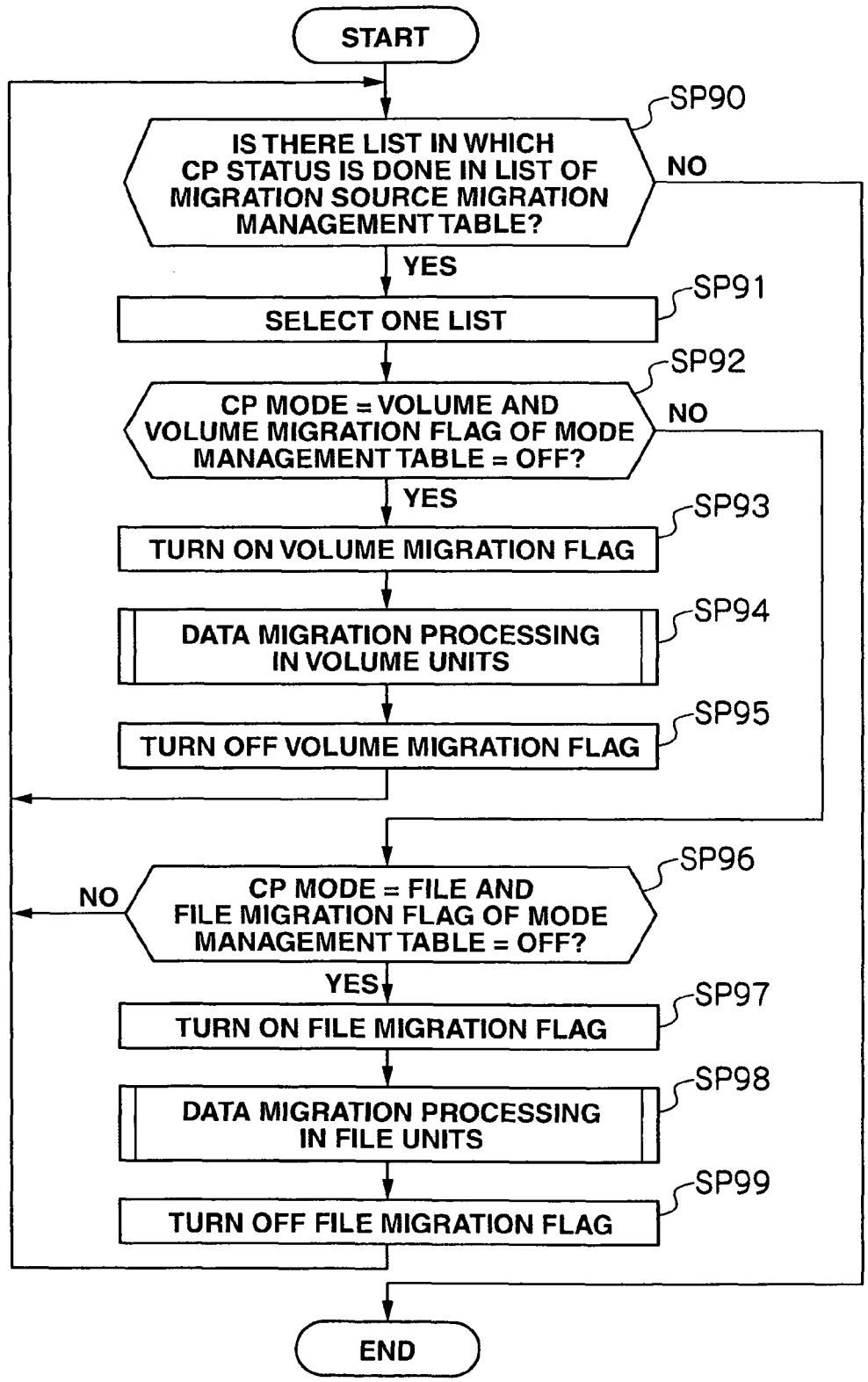
FIG. 30 is a flowchart explaining the processing contents of the CPU of a host apparatus concerning the data migration execution processing.

Meanwhile, FIG. 33 shows the flow of data copy in file units (hereinafter referred to as the "file unit data copy processing") to be performed at step SP98 in the data migration execution processing (FIG. 30).

Here, the CPU 50 of the host apparatus 41 foremost refers to the storage management table 91, and confirms which storage apparatus is the external storage apparatus. Here, the third storage apparatus 44 corresponds to the external storage apparatus.

Subsequently, the CPU 50 refers to the migration management table 92 (92-1) corresponding to the migration source storage apparatus, and extracts all lists in which the same LDEV number as the LDEV number stored in the LDEV number column 92C of the target list is stored in the LDEV number column 92C (SP110). As a result of this processing, all other file systems stored in the same LDEV 80 as the file system corresponding to the target list will be extract.

For example, in the example shown in FIG. 32A, assuming that the target list is the second list from the right (file system list in which the file system name is "/opt"), the list in which the LDEV number of "001_02" stored in the LDEV number column 92C of that list is stored in the LDEV number column 92C is the list on the far left. Thus, the list on the far left will be extract at step SP110.

Subsequently, the CPU 50, as shown in FIG. 34A and FIG. 34B, copies the information stored respectively in the storage identification column 92A, the LUN column 92B, the LDEV number column 92C, the capacity column 92D, the file system type column 92E, the file system name column 92F, the file system capacity column 92G, the file system mode column 92H and the migration target column 92K of each list extracted at step SP110 to the migration management table 92 corresponding to the migration destination storage apparatus, and thereby registers the file systems in the migration management table 92 corresponding to the migration destination storage apparatus (SP111).

Subsequently, the CPU 50 determines whether there is a list in which data migration of the corresponding file system has not been performed ("Done" is not stored in the copy status column 92M) among the lists selected from the migration management table 92 corresponding to the migration source storage apparatus at step SP110 (SP112).

If the CPU 50 obtains a positive result in this determination, it selects that list (SP113), and sends the data read request of the file system corresponding to that list to the migration source storage apparatus (SP114). Consequently, data (including management information) of the file system is sequentially read from the migration destination storage apparatus in file units according to the read request (SP115), and then sent to the host apparatus 41 (SP116).

When the CPU 50 receives the data of the file system, it transfers this together with the write request to the migration destination storage apparatus (SP117). Consequently, this data is written into the migration destination LDEV in the migration destination storage apparatus (SP118), and a data writing completion notice indicating the completion of data writing is thereafter issued from the migration destination storage apparatus to the host apparatus 117 (SP119).

When the CPU 50 receives the data writing completion notice, as shown in FIG. 34, it stores "Done" in each copy status column 92M of the corresponding list in the migration management table 92 corresponding to the migration source storage apparatus and the corresponding list in the migration management table 92 corresponding to the migration destination storage apparatus (SP120), and thereafter returns to step SP110.

Subsequently, the CPU 50 executes the same processing to all lists storing "File" in the copy mode column 92L of the migration management table 92 corresponding to the migration source storage apparatus (SP110 to SP114, SP117, SP120-SP110), and ends this file unit data copy processing when the data migration of all file systems corresponding to such lists is complete.

(3-3) Effect of Present Embodiment

As described above, with the storage system 40 according to the present embodiment, since data of the LDEV 80 is preferentially migrated in volume units when the size of that LDEV 80 to be subject to data migration is large and the time stamp of the data stored in the LDEV 80 is old, and data of the LDEV 80 is preferentially migrated in file unites when the size of that LDEV 80 to be subject to data migration is small and the time stamp of the data stored in the LDEV 80 is new, data migration can be performed effectively.

In addition, with the storage system 40, data migration can be performed even more effectively since the data migration processing in volume units and the data migration processing in file units are concurrently performed.

(4) Second Embodiment

FIG. 12 and FIG. 13 show the overall storage system 100 according to the second embodiment. The storage system 100 is configured similar to the storage system 40 of the first embodiment other than the point of being able to perform data migration in storage apparatus units in addition to volume units and file units.

In other words, in the case of the storage system 100 according to this embodiment, as shown in FIG. 35, the storage management table 101 is configured from a storage identification column 101A, a WWN column 101B, a migration source/migration destination column 101C and an overall storage migration flag column 101D.

The storage identification column 101A, the WWN column 101B and the migration source/migration destination column 101C respectively store similar information as the storage identification column 91A, the WWN column 91B and the migration source/migration destination column 91C of the storage management table 91 according to the first embodiment explained with reference to FIG. 15.

The overall storage migration flag column 101D stores a flag (hereinafter referred to as the "overall storage migration flag") representing whether to migrate all data in the migration source storage apparatus (first storage apparatus 42) to the migration destination storage apparatus (second storage apparatus 43) according to the setting input by the system administrator.

When the overall storage migration flag stored in the overall storage migration flag column 101D of the storage management table 101 is set to "ON" ("1" is stored in the overall storage migration flag column 101D), the CPU 50 of the host apparatus 102 in the second embodiment searches for an LDEV 83 having the same capacity as the LDEV 80 in the migration destination storage apparatus regarding the respective LDEVs 80 storing the migration target data in the migration source storage apparatus at step SP22 of the data migration processing explained with reference to FIG. 20.

The CPU 50 additionally updates the migration management table 92 of the migration source storage apparatus and the migration destination storage apparatus so that the data stored in each LDEV 80 to be subject to data migration in the migration source storage apparatus is migrated to the LDEV 83 in the migration destination storage apparatus detected as a result of the search.

Consequently, in the storage system 100, all data in the migration source storage apparatus is thereafter migrated to the migration destination storage apparatus based on the data migration method determination processing at step SP22 and the data migration execution processing at step SP23 of the data migration processing.

Figure 36:
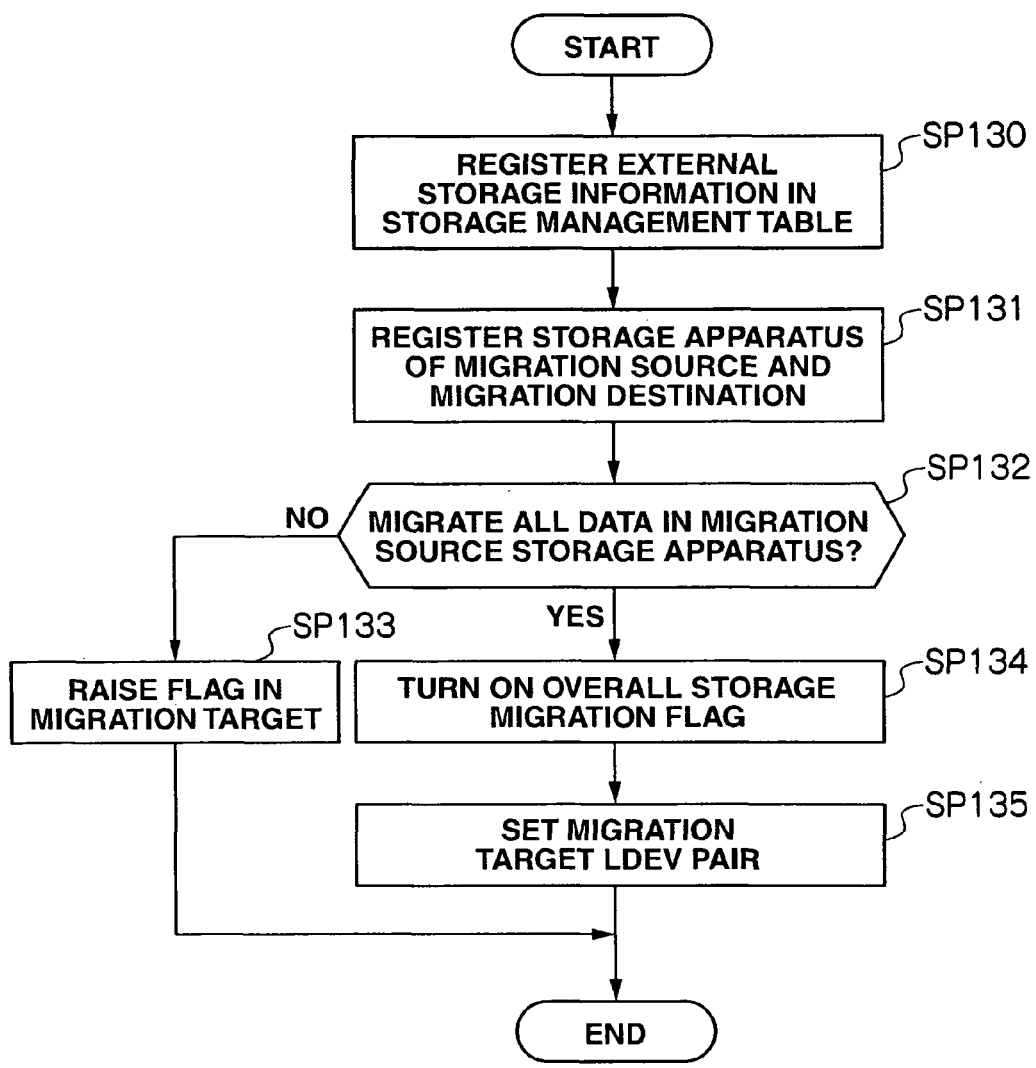
FIG. 36 is a flowchart explaining the specific processing contents of the CPU of a host apparatus concerning the data migration condition setting processing according to the second embodiment.

FIG. 36 shows the specific processing contents of the data migration condition setting processing according to the second embodiment to be performed at step SP22 of the data migration processing explained with reference to FIG. 20. The CPU 50 of the host apparatus 102 according to this embodiment executes the data migration condition setting processing shown in FIG. 36 according to the application program 103 of the second embodiment stored in the memory 51.

Specifically, the CPU 50 starts the data migration condition setting processing upon proceeding to step SP22 of the data migration processing, and foremost registers the storage identification number and the WWN of the external storage apparatus (third storage apparatus 44) in the storage management table 91 according to the setting input by the system administrator as with the data migration condition setting processing of the first embodiment explained with reference to FIG. 24 (SP130), and registers the migration source storage apparatus and the migration destination storage apparatus in the storage management table 91 (SP131).

Subsequently, the CPU 50 determines whether the setting has been configured to migrate all data in the migration source storage apparatus to the migration destination storage apparatus (SP132).

If the CPU 50 obtains a negative result in this determination, as with step SP42 of the data migration condition setting processing according to the first embodiment, stores the migration target number in the migration target column 92K of lists in the migration management table 92 corresponding respectively to each LDEV 80, 83 or the file system of the data migration source and the data migration destination in each migration management table 92 (92-1, 92-2) according to the setting input by the system administrator (SP133), and thereafter ends this data migration condition setting processing.

Contrarily, if the CPU 50 obtains a positive result in this determination, it sets the overall storage migration flag in the overall storage migration flag column 101D corresponding migration source storage apparatus of the storage management table 101 to "ON" (SP134).

The CPU 50 thereafter sets each LDEV 80 in the migration source storage apparatus and the corresponding LDEV 83 in the migration destination storage apparatus as a copy pair (SP135).

Specifically, for instance, the CPU 50 refers to the capacity column 92D of each list in the migration management table 92 (92-1) corresponding to the migration source storage apparatus and the migration management table 92 (92-2) corresponding to the migration destination storage apparatus, and searches for the LDEV 83 having the same capacity as the LDEV 80 in the migration destination storage apparatus regarding the respective LDEVs 80 storing the migration target data in the migration source storage apparatus. If an LDEV 83 having the same capacity as the LDEV 80 does not exist in the migration destination storage apparatus, under the control of the CPU 50, an LDEV 83 having the same capacity as the LDEV 80 may be created in the migration destination storage apparatus.

The CPU 50 registers the same migration target number in the migration target column 92K of the list corresponding to the LDEV 83 in the migration destination storage apparatus detected in the search (list in the migration management table 92 (92-1) corresponding to the migration source storage apparatus), and the migration target column 92K of the list corresponding to the LDEV 80 in the corresponding migration source storage apparatus (list in the migration management table 92 (92-2) corresponding to the migration destination storage apparatus).

When the CPU 50 completes the pair configuration, it ends the data migration condition setting processing according to the second embodiment.

With the storage system 100 according to the present embodiment, since data migration in storage apparatus units can also be performed in addition to data migration in volume units and file units, it is possible to facilitate the data migration work in storage apparatus units. Consequently, for example, the process for replacing the a storage apparatus from an existing storage apparatus to a new storage apparatus can be facilitated, and the load of such replacement work can be alleviated.

(5) Other Embodiments

Although the first and second embodiments described above explained a case of applying the present invention to the storage systems 40, 100 configured as shown in FIG. 12, the present invention is not limited to the foregoing configuration, and can be broadly applied to storage systems of various other configurations. For example, the number of storage apparatuses other than the third storage apparatus 44 may be three or more, or the number of storage apparatus having the functions (external connection function and same-chassis internal copy function) of the third storage apparatus 44 may be two or more.

Although the first and second embodiments described above explained a case of selecting a list having the smallest priority order stored in the copy mode column 92L as the method for selecting one list among the corresponding lists in the migration management table 92 corresponding to the migration source storage apparatus at step SP91 of the data migration execution processing explained with reference to FIG. 30, the present invention is not limited to the foregoing configuration, and a method of sequentially selecting a list from the smallest priority order among the list group in which the copy mode is set to "Volume," and thereafter sequentially selecting a list from the smallest priority order among the list group in which the copy mode is set to "File" may also be adopted. In other words, various other methods may be used for selecting the lists so as long as the lists are sequentially selected in order from the list having the smallest priority order.

Although the first and second embodiments described above explained a case where the host apparatus 41 as the higher-level apparatus equipped with a copy function for reading data stored in the LDEV 80 of the first storage apparatus 42 in file units from the first storage apparatus 42 and copying the data to the corresponding second volume 83 in the second storage apparatus 43 is additionally equipped with a function as a data migration control unit for executing necessary control processing for deciding whether to migrate the data stored in the LDEV 80 with the first data migration method in volume units or the second data migration method in file unites and performing the data migration based on the decided first or second data migration method according to the status of data stored in the LDEV 80 to be subject to data migration, the present invention is not limited to the foregoing configuration, the function as the data migration control unit may be loaded in a management server provided independently from the host apparatus 41, or the third storage apparatus 44.

In addition, although the first and second embodiments described above explained a case of adopting a storage apparatus (third storage apparatus 44) equipped with a virtualization function and a same-chassis internal copy function as the virtualization apparatus equipped with such virtualization function for virtualizing the LDEV 80 in the first storage apparatus 42 and the LDEV 83 in the second storage apparatus 43 and respectively providing these as a virtual volume 60 to the host apparatus 41, and the same-chassis internal copy function for controlling the first and second storage apparatuses 42, 43 so as to copy the data stored in the virtual volume 60 associated with the LDEV 80 in the first storage apparatus 42 to the virtual volume 60 associated with the LDEV 83 in the second storage apparatus 43, the present invention is not limited to the foregoing configuration, and the virtualization apparatus may be a server or the like other than a storage apparatus so as long as it is equipped with the foregoing virtualization function and the same-chassis internal copy function.

The present invention can be broadly applied to various storage systems including archive systems.

What is claimed is:

1. A storage system, comprising:
a host apparatus equipped with a second copy function for reading data stored in a first volume of a first storage apparatus in file units from the first storage apparatus and copying the data to a corresponding second volume of a second storage apparatus;
a controller equipped with a first copy function for controlling the first and second storage apparatuses to copy data stored in the first volume to the second volume in volume units; and
a data migration control unit for deciding whether to migrate data stored in the first volume according to a first data migration method that migrates data in volume units or a second data migration method that migrates data in file units according to the status of data stored in the first volume to be subject to data migration, and executing necessary control processing so that data migration is performed according to the decided first or second data migration method;
wherein the data migration control unit preferentially decides the first data migration method as the data migration method when
the capacity of the first volume to be subject to data migration is greater than a first threshold value,
a file system exists in the first volume, and
the last update date and time of data stored in the first volume is older than a second threshold value, wherein the second threshold value is a date and time going back a predetermined period from a current date and time, and
preferentially decides the second data migration method as the data migration method when
the capacity of the first volume to be subject to data migration is greater than the first threshold value,
a file system exits in the first volume, and
the last update date and time of data stored in the first volume is newer than the second threshold value.

2. The storage system according to claim 1,
wherein the host apparatus comprises the data migration control unit.

3. The storage system according to claim 1,
wherein the data migration control unit decides the first data migration method as the data migration method when
the capacity of the first volume to be subject to data migration is smaller than the first threshold value,
a file system does not exist in the first volume, and the last update date and time of data stored in the first volume is newer than the second threshold value.

4. The storage system according to claim 1,
wherein, if data stored in the first volume to be subject to data migration is archive data to be archived, the data migration control unit preferentially decides the first data migration method as the data migration method when the capacity of the first volume is greater than a first threshold value, and preferentially decides the second data migration method as the data migration method when the capacity of the first volume is smaller than a first threshold value.

5. The storage system according to claim 1,
wherein the data migration control unit decides the first data migration method as the data migration method when
the capacity of the first volume to be subject to data migration is smaller than a first threshold value,
a file system does not exist in the first volume, and
the last update date and time of data stored in the first volume is older than the second threshold value.

6. The storage system according to claim 1,
wherein the data migration control unit executes the necessary control processing so as to respectively decide the priority of data migration of data stored in each of the first volumes in a volume group to perform data migration with the first data migration method and a volume group to perform data migration with the second data migration method according to the status of data stored in each of the plurality of first volumes to be subject to data migration, and migrates data stored in each of the first volumes to the second volume in the order of the decided priority.

7. The storage system according to claim 1,
wherein the data migration control unit executes the necessary control processing by concurrently performing data migration processing based on the first data migration method and data migration processing based on the second data migration method.

8. A data migration method in a storage system, wherein the storage system includes
a host apparatus equipped with a second copy function for reading data stored in a first volume of a first storage apparatus in file units from the first storage apparatus and copying the data to a corresponding second volume of a second storage apparatus, and
a controller equipped with a first copy function for controlling the first and second storage apparatuses to copy data stored in the first volume to the second volume in volume units;
wherein the data migration method comprises:
a first step for deciding whether to migrate data stored in the first volume according to a first data migration method that migrates data in volume units or a second data migration method that migrates data in file units according to the status of data stored in the first volume to be subject to data migration,
wherein the first step includes deciding the first data migration method as the data migration method when
the capacity of the first volume to be subject to data migration is smaller than a first threshold value,
a file system does not exist in the first volume,
and the last update date and time of data stored in the first volume is newer than a second threshold value, wherein the second threshold value is a date and time going back a predetermined period from a current date and time; and
a second step for performing data migration according to the decided first or second data migration method.

9. The method of claim 8, wherein the first step is performed by the host apparatus.

10. The method of claim 8, wherein the first step further includes:
preferentially deciding the first data migration method as the data migration method when
the capacity of the first volume to be subject to data migration is greater than the first threshold value,
a file system exists in the first volume, and
the last update date and time of data stored in the first volume is older than the second threshold value, and
preferentially deciding the second data migration method as the data migration method when
the capacity of the first volume to be subject to data migration is smaller than a first threshold value,
a file system exists in the first volume, and
the last update date and time of data stored in the first volume is newer than a second threshold value.

11. The method of claim 8, further comprising:
executing the necessary control processing by concurrently performing data migration processing based on the first data migration method and data migration processing based on the second data migration method.

12. A storage system, comprising:
a host apparatus equipped with a second copy function for reading data stored in a first volume of a first storage apparatus in file units from the first storage apparatus and copying the data to a corresponding second volume of a second storage apparatus;
a controller equipped with a first copy function for controlling the first and second storage apparatuses to copy data stored in the first volume to the second volume in volume units; and
a data migration control unit for deciding whether to migrate data stored in the first volume according to a first data migration method that migrates data in volume units or a second data migration method that migrates data in file units according to the status of data stored in the first volume to be subject to data migration, and executing necessary control processing so that data migration is performed according to the decided first or second data migration method;
wherein the data migration control unit executes the necessary control processing by concurrently performing data migration processing based on the first data migration method and data migration processing based on the second data migration method; and
wherein the data migration control unit decides the first data migration method as the data migration method when
the capacity of the first volume to be subject to data migration is smaller than a first threshold value,
a file system does not exist in the first volume, and
the last update date and time of data stored in the first volume is newer than a second threshold value, wherein the second threshold value is a date and time going back a predetermined period from a current date and time.

13. The storage system according to claim 12,
wherein the host apparatus comprises the data migration control unit.

14. The storage system according to claim 12,
wherein the data migration control unit preferentially decides the first data migration method as the data migration method when the capacity of the first volume to be subject to data migration is greater than the first threshold value, a file system exists in the first volume, and the last update date and time of data stored in the first volume is older than the second threshold value, and preferentially decides the second data migration method as the data migration method when the capacity of the first volume to be subject to data migration is smaller than the first threshold value, a file system exists in the first volume, and the last update date and time of data stored in the first volume is newer than the second threshold value.

15. The storage system according to claim 12, wherein, if data stored in the first volume to be subject to data migration is archive data to be archived, the data migration control unit preferentially decides the first data migration method as the data migration method when the capacity of the first volume is greater than a first threshold value, and preferentially decides the second data migration method as the data migration method when the capacity of the first volume is smaller than a first threshold value.

16. The storage system according to claim 12, wherein the data migration control unit decides the first data migration method as the data migration method when the capacity of the first volume to be subject to data migration is smaller than a first threshold value, a file system does not exist in the first volume, and the last update date and time of data stored in the first volume is older than the second threshold value.

17. The storage system according to claim 12, wherein the data migration control unit executes the necessary control processing so as to respectively decide the priority of data migration of data stored in each of the first volumes in a volume group to perform data migration with the first data migration method and a volume group to perform data migration with the second data migration method according to the status of data stored in each of the plurality of first volumes to be subject to data migration, and migrates data stored in each of the first volumes to the second volume in the order of the decided priority.

* * * * *